United States Patent [19]
Harrold et al.

[11] Patent Number: 6,023,315
[45] Date of Patent: *Feb. 8, 2000

[54] SPATIAL LIGHT MODULATOR AND DIRECTIONAL DISPLAY

[75] Inventors: Johnathan Harrold, Oxford; Graham John Woodgate, Oxfordshire, both of United Kingdom

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/674,906

[22] Filed: Jul. 3, 1996

[30] Foreign Application Priority Data

Jul. 4, 1995 [GB] United Kingdom .................... 9513634
Jan. 26, 1996 [GB] United Kingdom .................... 9601618

[51] Int. Cl.$^7$ .................................................. G02F 1/1335
[52] U.S. Cl. .......................... 349/108; 349/106; 349/109; 359/254; 359/23
[58] Field of Search ..................... 349/106, 108, 349/109; 359/22, 23, 254, 316, 320

[56] References Cited

U.S. PATENT DOCUMENTS

| | | | |
|---|---|---|---|
| 4,593,978 | 6/1986 | Mourey et al. ........................ | 350/339 |
| 4,745,406 | 5/1988 | Hayashi et al. . | |
| 4,920,409 | 4/1990 | Yamagishi ................................ | 358/56 |
| 4,957,351 | 9/1990 | Shioji ..................................... | 350/348 |
| 4,986,637 | 1/1991 | Yamaguchi .......................... | 350/339 F |

FOREIGN PATENT DOCUMENTS

| | | |
|---|---|---|
| 0194315 | 9/1986 | European Pat. Off. . |
| 0244013 | 11/1987 | European Pat. Off. . |
| 0454538 | 10/1991 | European Pat. Off. . |
| 0537853 | 4/1993 | European Pat. Off. . |
| 0625861 | 11/1994 | European Pat. Off. . |
| 0721132 | 7/1996 | European Pat. Off. . |
| 6043635 | 3/1985 | Japan . |
| 04237021 | 8/1992 | Japan . |
| 2008304 | 5/1979 | United Kingdom . |
| 2139394 | 11/1984 | United Kingdom . |
| 2188183 | 9/1987 | United Kingdom . |
| 2278223 | 11/1994 | United Kingdom . |
| 9522782 | 8/1995 | WIPO . |

OTHER PUBLICATIONS

Search Report for Application No. 96304960.6–2205–; Dated Nov. 24, 1997. (EPO)
Search Report for GB Appl. 9601618.3, mailed Mar. 25, 1996.
Search Report for GB Appl. 9513634.7, mailed Sep. 14, 1996.
US Patent Application of Woodgate et al., Serial No. 08/675,584, filed Jul. 3, 1996.
Search Report for British Application GB 9601618.3, mailed Aug. 30, 1996.

*Primary Examiner*—Gerorgia Epps
*Assistant Examiner*—Margaret Burke

[57] ABSTRACT

A liquid crystal spatial light modulator comprises columns and rows of picture elements. The columns are arranged as groups of columns, for instance under respective parallax generating elements in an autostereoscopic 3D display. The picture elements are arranged as sets to form color picture elements such that the picture elements of each set are disposed at the apices of a polygon, such as a triangle, and are disposed in corresponding columns of the groups of columns.

21 Claims, 30 Drawing Sheets

Comparison of RGGB and RGYB generation in a typical case

N.B. Y = R+G+B

SPATIAL LIGHT MODULATOR AND DIRECTIONAL DISPLAY

TECHNICAL FIELD OF THE INVENTION

The present invention relates to a spatial light modulator and to a directional display. The directional display may, for instance, be a three dimensional (3D) autostereoscopic display.

The term "spatial light modulator" as used herein is defined to include not only devices which modulate light from an external light source but also devices which emit light of a modulatable intensity.

DESCRIPTION OF THE RELATED ART

FIG. 32 of the accompanying drawings illustrates the picture element (pixel) pattern and the colour filter arrangement of a known type of liquid crystal display (LCD) which may be used in a known 3D autostereoscopic display in association with a lenticular screen 30 comprising lenticules such as 30a and 30b. The LCD is rotated by 90° so that the original rows of pixels are now vertical columns of pixels under the lenticules. The letters R, G and B indicate the colour filter associated with each pixel.

When suitably illuminated, the pixels of columns indicated by V1 and V2 cooperate with the lenticular screen 30 to supply two 2 dimensional (2D) images in adjacent view windows so that, when the eyes of an observer are placed in the windows, a 3D image is perceivable. In order to provide a full colour image, the LCD pixels are grouped and addressed as composite pixels, each comprising a red pixel, a green pixel and a blue pixel. Rectangles such as 41 indicate the groupings of the pixels to form the composite colour pixels.

Within the groupings or "tessellation" shown in FIG. 32, the RGB pixels of each composite pixel are spaced apart vertically and located in a common column. However, the use of this panel presents severe practical disadvantages. Use of a rotated LCD in this manner complicates the interface with standard video or computer signals and usually requires a frame memory. For instance, this arrangement requires that data be stored for three line periods. Further, each composite pixel is vertically extended and this reduces the ability of the observer to integrate the individual pixels of each composite pixel into a single colour at close viewing distances. Also, this arrangement produces dark lines in the image resulting from the gaps between the columns V1 and V2 from which no light emanates.

FIG. 33 illustrates another known arrangement of LCD pixels and colour filter pattern in a known 3D autostereoscopic display. The LCD of FIG. 33 differs from that of FIG. 32 in that it is used in its normal unrotated configuration. In order to provide composite colour pixels, the individual pixels are grouped together as indicated, for example, by the elongate rectangle 41. In this case, the pixels under the lenticules 30a, 30b and 30c cooperate to form a composite colour pixel.

This arrangement severely reduces the achieved 3D horizontal resolution, which is already reduced by the need to generate multiple view images V1 and V2. The composite pixels are also highly extended horizontally and this reduces the ability of the observer to integrate the individual pixels into a single colour at close viewing distances. Further, a complicated horizontal data delay circuit is required. Also, this arrangement produces dark lines in the images resulting from the inter-column gaps from which no light emanates.

FIG. 34 illustrates a known type of 3D autostereoscopic display using RGGB quad pixels. This arrangement has all of the disadvantages associated with the arrangement shown in FIG. 32. Further, the composite pixels are even more extended in the vertical direction which increases the problem of lack of colour integration at close viewing distances.

FIG. 35 illustrates a LCD made in accordance with the technique disclosed in British Patent Application No. 9513634.7 but using the standard colour filter arrangement of a known type of 2D delta panel. The triangle 41 indicates the RGB pixels which form a composite colour pixel for use in 2D displays. However, such an arrangement is unsuitable for 3D use because the pixels of each composite pixel would be directed to different view windows by a parallax element such as a lenticular screen.

FIG. 36 shows an LCD of the RGGB type in which each composite colour pixel comprises a red pixel, two green pixels and a blue pixel. However, such an arrangement is unsuitable for 3D use because the individual pixels of each composite colour pixel would not be directed to the same window by a parallax element.

According to a first aspect of the invention, there is provided a spatial light modulator as defined in the appended claim 1.

According to a second aspect of the invention, there is provided a directional display as defined in the appended claim 20.

Preferred embodiments of the invention are defined in the other appended claims.

It is thus possible to provide an SLM which is suitable for use in directional displays, such as autostereoscopic 3D displays, and in which electronic signal processing requirements and problems of colour integration for composite colour pixels are substantially reduced. The separations between individual pixels of each composite pixel can be reduced so that colour integration occurs over a substantially larger range of viewing distances.

BRIEF DESCRIPTION OF THE DRAWINGS

The invention will be further described, by way of example, with reference to the accompanying drawings, in which.

DETAILED DESCRIPTION

Figure 1:
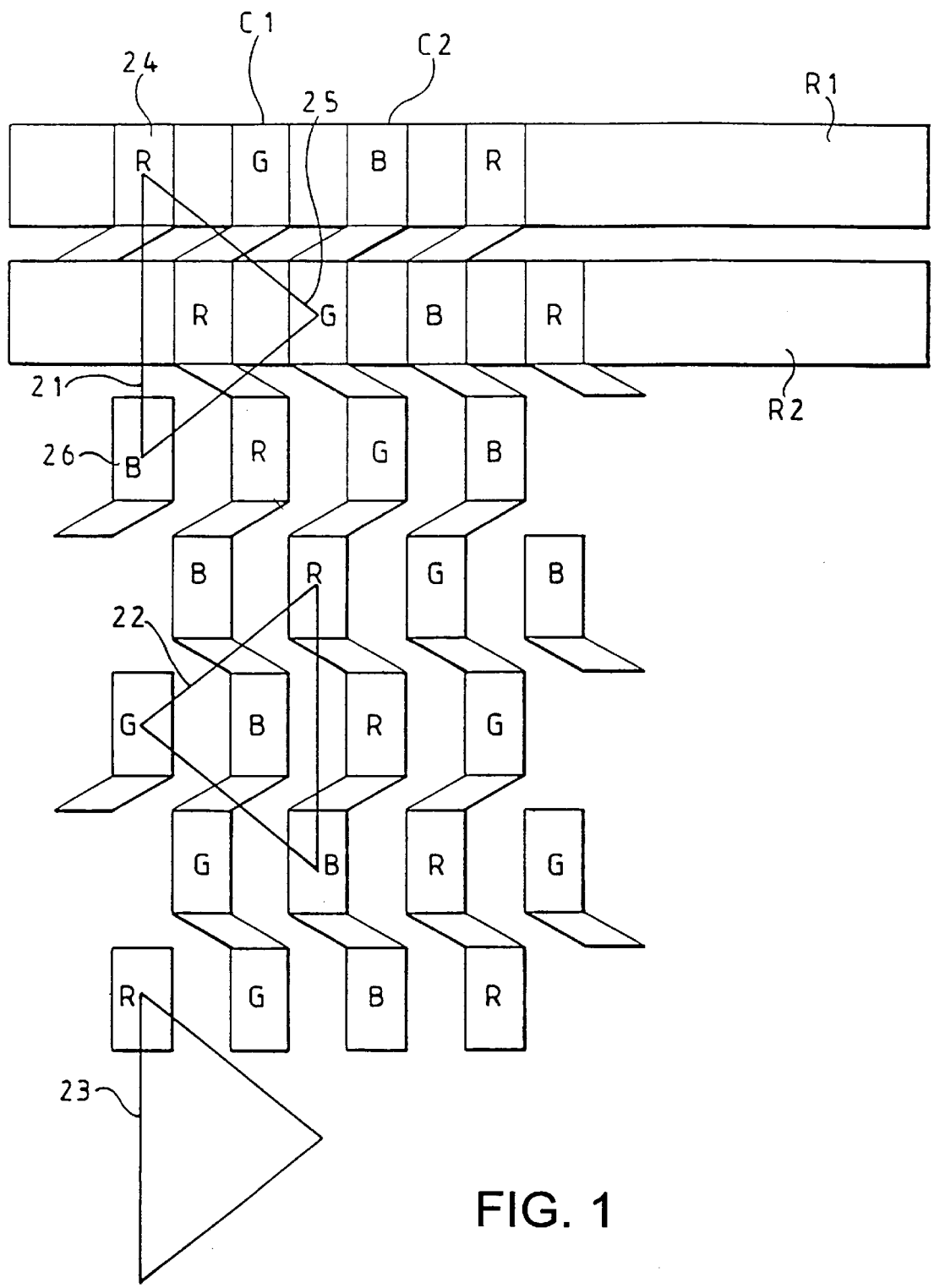
FIG. 1 illustrates a pixel and colour filter arrangement of an SLM constituting a first embodiment of the invention.

Like reference numerals refer to like parts throughout the drawings.

FIG. 1 illustrates an SLM comprising a liquid crystal device (LCD) of the passive matrix type with SLM pixel positions in an arrangement disclosed in EP 0 625 861. Alternatively, an active matrix LCD may be provided with active elements and electrodes disposed in the regions between pixels. The LCD comprises row electrodes such as R1 and R2 disposed on one substrate and facing zig-zag column electrodes such as C1 and C2 disposed on a facing substrate. Polarisers and alignment layers (not shown) are provided and a liquid crystal material is disposed between the substrates so as to form the device.

In order to provide a full colour display, a colour filter arrangement is provided comprising diagonal red, green and blue stripes, each stripe being aligned with a single diagonal line of individual pixels. The colours of the individual pixels are indicated by the letters R, G and B.

Triangles (i.e., three-sided polygons) 21, 22, and 23 illustrate the groupings of triplets of LCD pixels which form composite colour pixels. For instance, the corners of the triangle 21 point to red, green and blue pixels 24, 25, and 26, respectively, which are addressed so as to constitute a single composite full colour pixel of the display. The triangles 21 to 23 thus constitute tessellations illustrating how the individual pixels are grouped to form the composite colour pixels. This arrangement is referred to as a "triangular tessellation" hereinafter.

Figure 32:
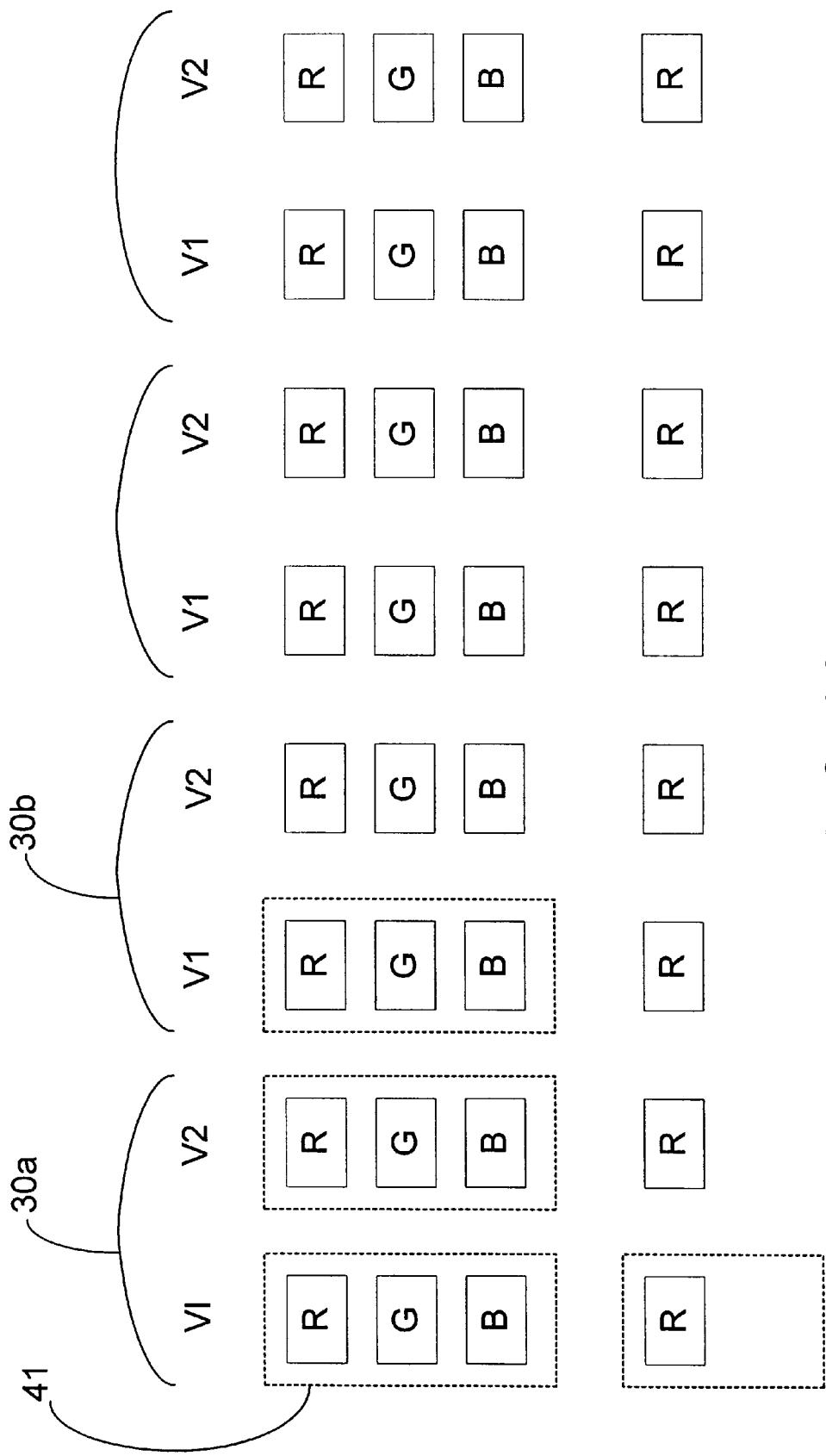
FIG. 32 illustrates part of a known type of 3D autostereoscopic display including a rotated stripe panel of known type.
Figure 33:
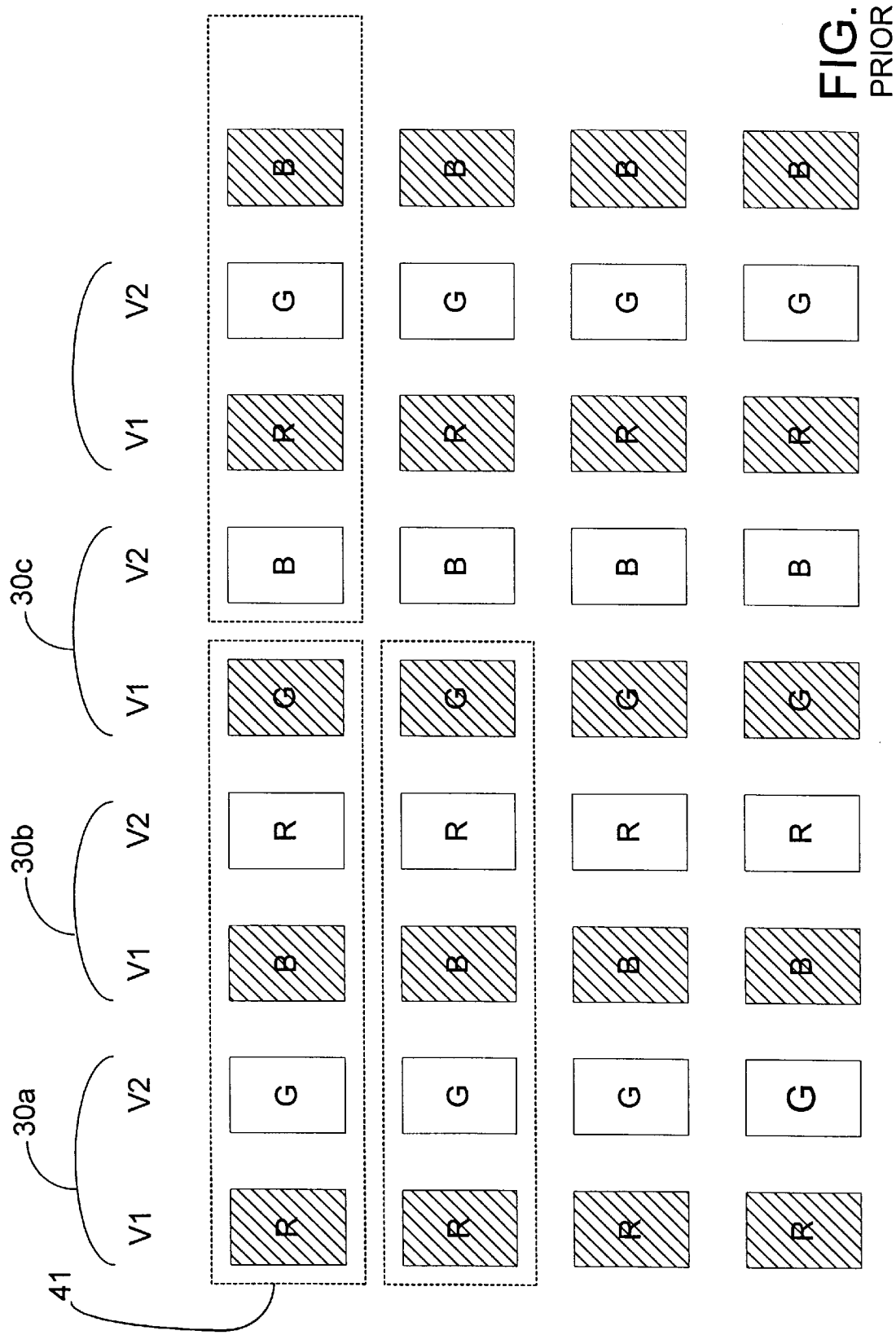
FIG. 33 illustrates a known type of 3D autostereoscopic display using a known type of non-rotated stripe panel.
Figure 34:
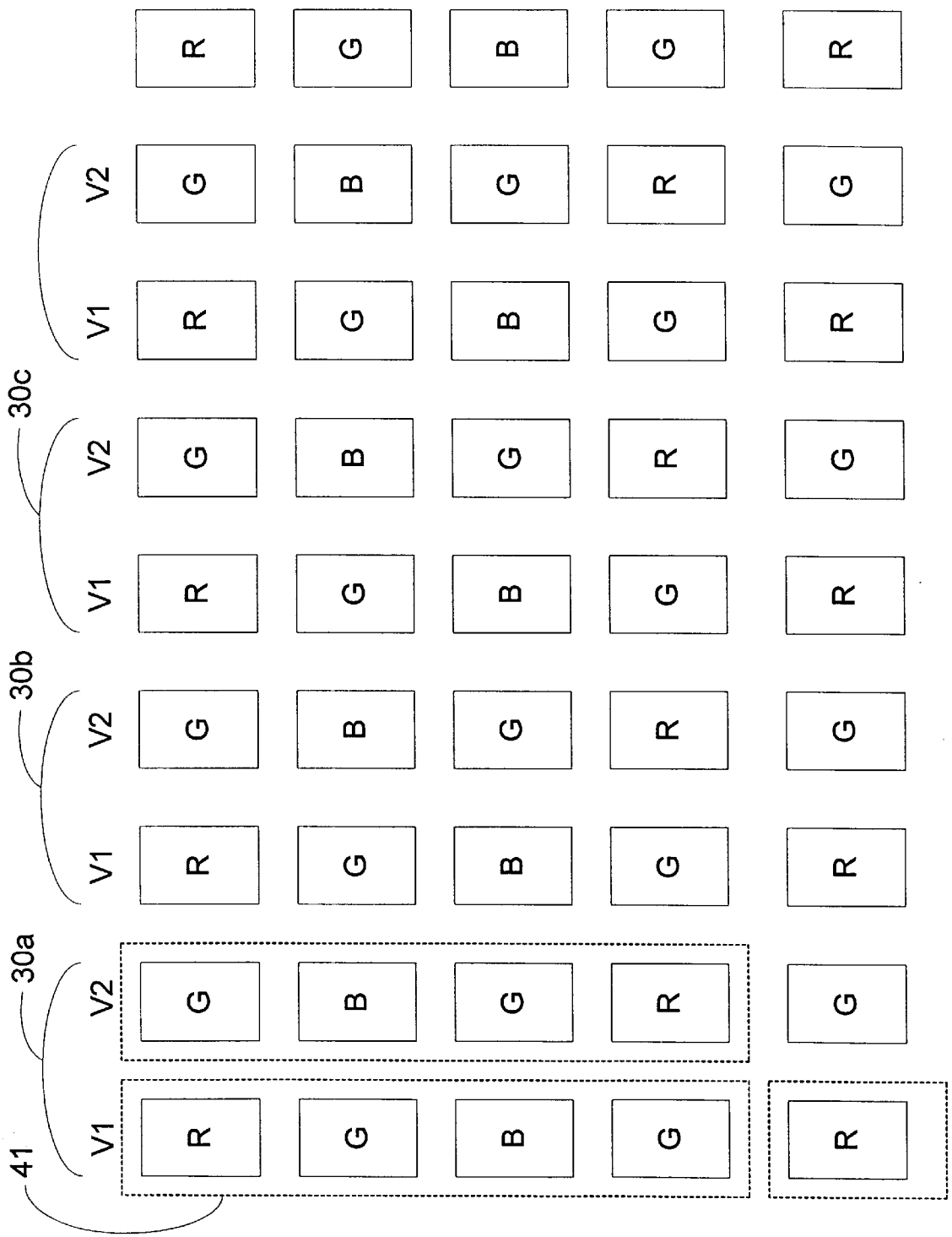
FIG. 34 illustrates part of a known type of 3D autostereoscopic display using a known type of RGGB panel.
Figure 35:
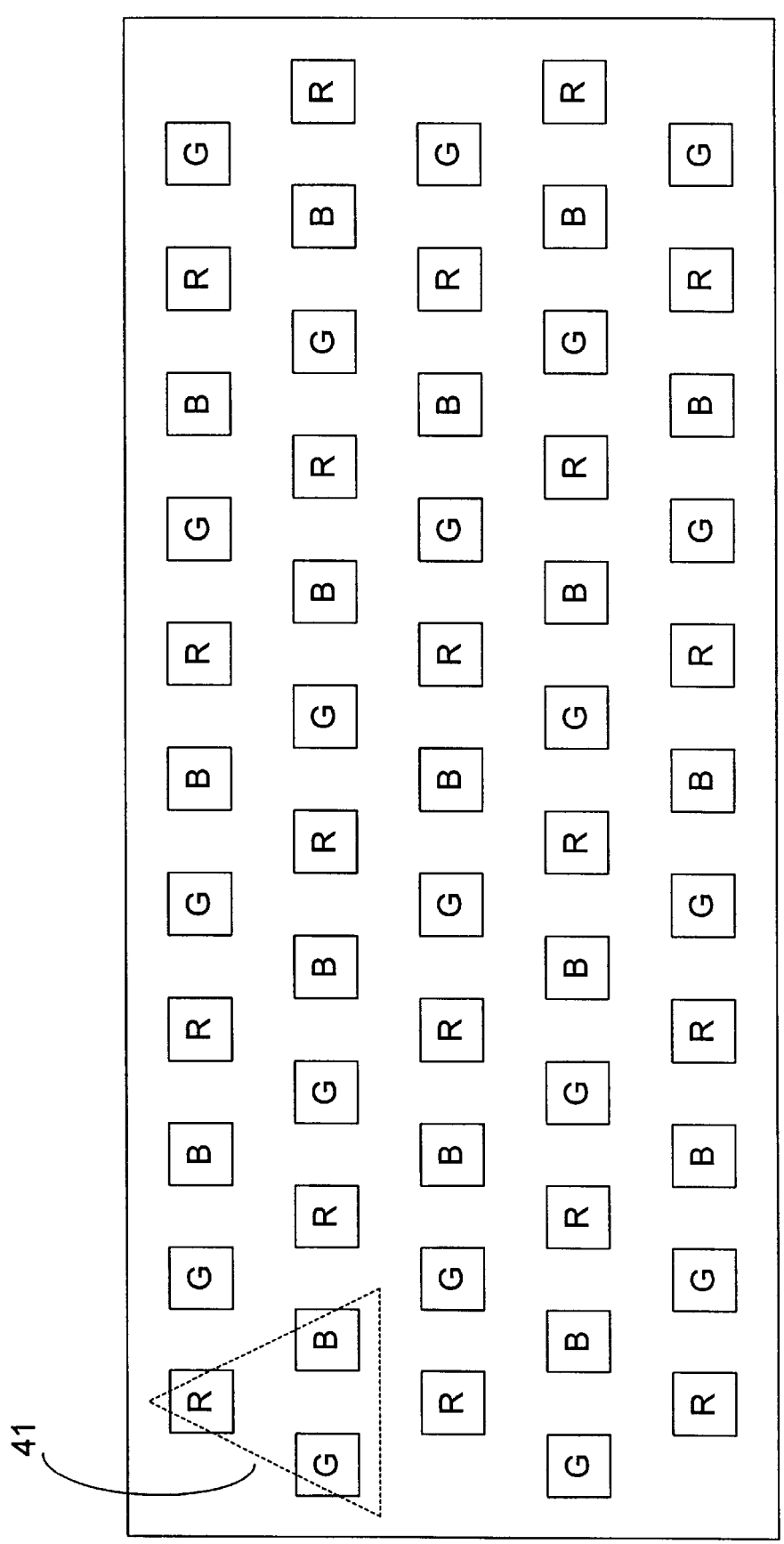
FIG. 35 illustrates a known type of LCD and a known colour filter arrangement for forming a 2D colour panel.
Figure 36:
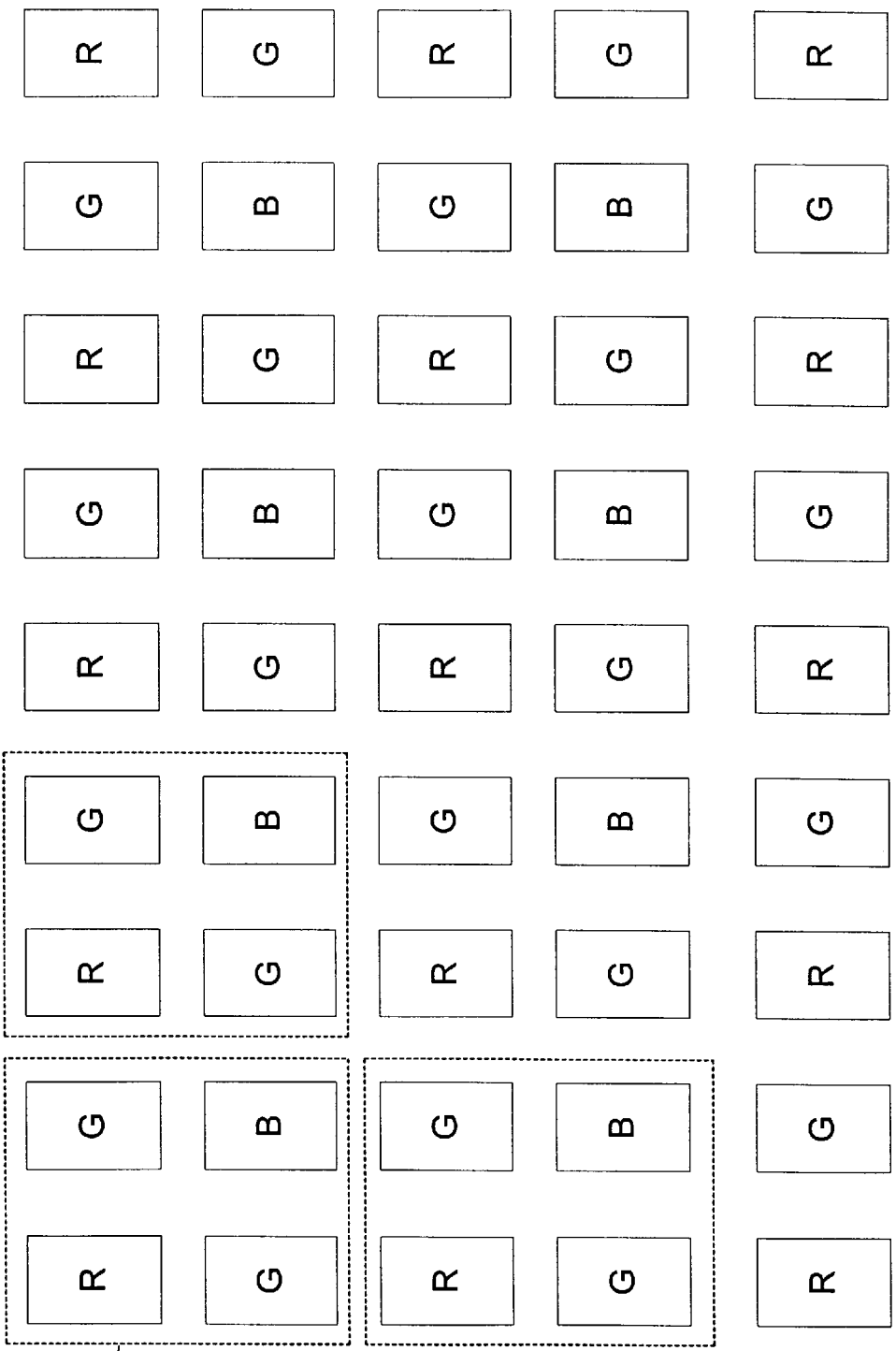
FIG. 36 illustrates a known type of RGGB display panel for 2D use.

Compared with the known arrangements shown in FIGS. 33 and 32, the composite pixels shown in FIG. 1 are less extended in the horizontal and vertical directions, respectively. The individual pixels forming each composite pixel are as close as possible to each other within the constraint that all of the pixels of each composite pixel must be imaged to the same viewing window. Further, instead of having essentially an elongate shape as shown in FIGS. 33 and 34, each composite pixel has a relatively small vertical and horizontal extension and thus has an improved aspect ratio. The reduced extension allows the composite pixels to be viewed from closer viewing distances before lack of colour integration becomes a problem.

Figure 2:
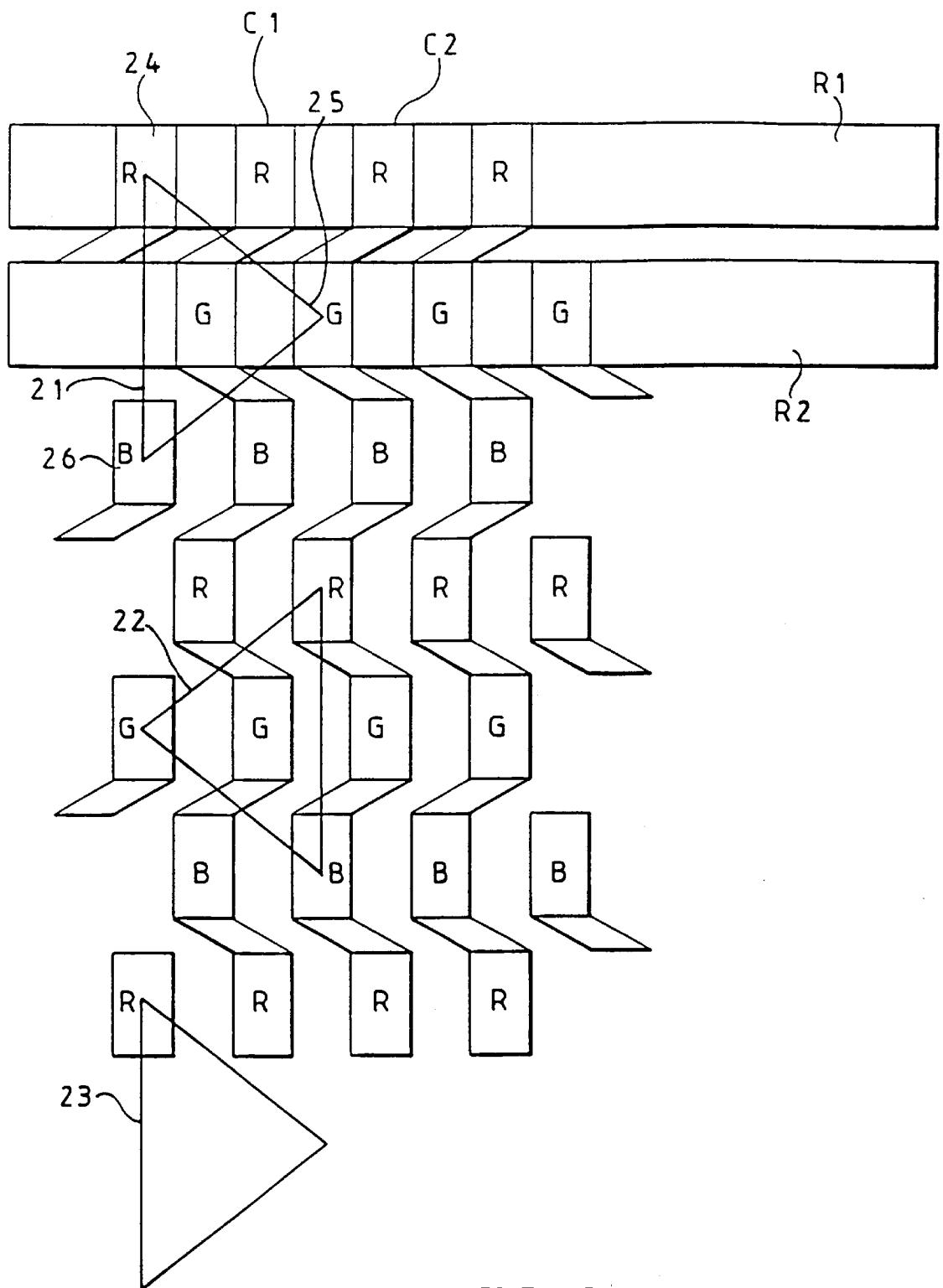
FIG. 2 illustrates a pixel and colour filter arrangement of an SLM constituting a second embodiment of the invention.

FIG. 2 illustrates an LCD having the same triangular tessellation of individual pixels to form composite colour pixels as shown in FIG. 1 but with a horizontally striped colour filter. The filter comprises repeated groups of RGB stripes, each of which is aligned with a single row of dots. Manufacture of displays using horizontally striped filters may be easier than diagonally striped filters, for instance in respect of alignment of the stripes with the dots.

Figure 3:
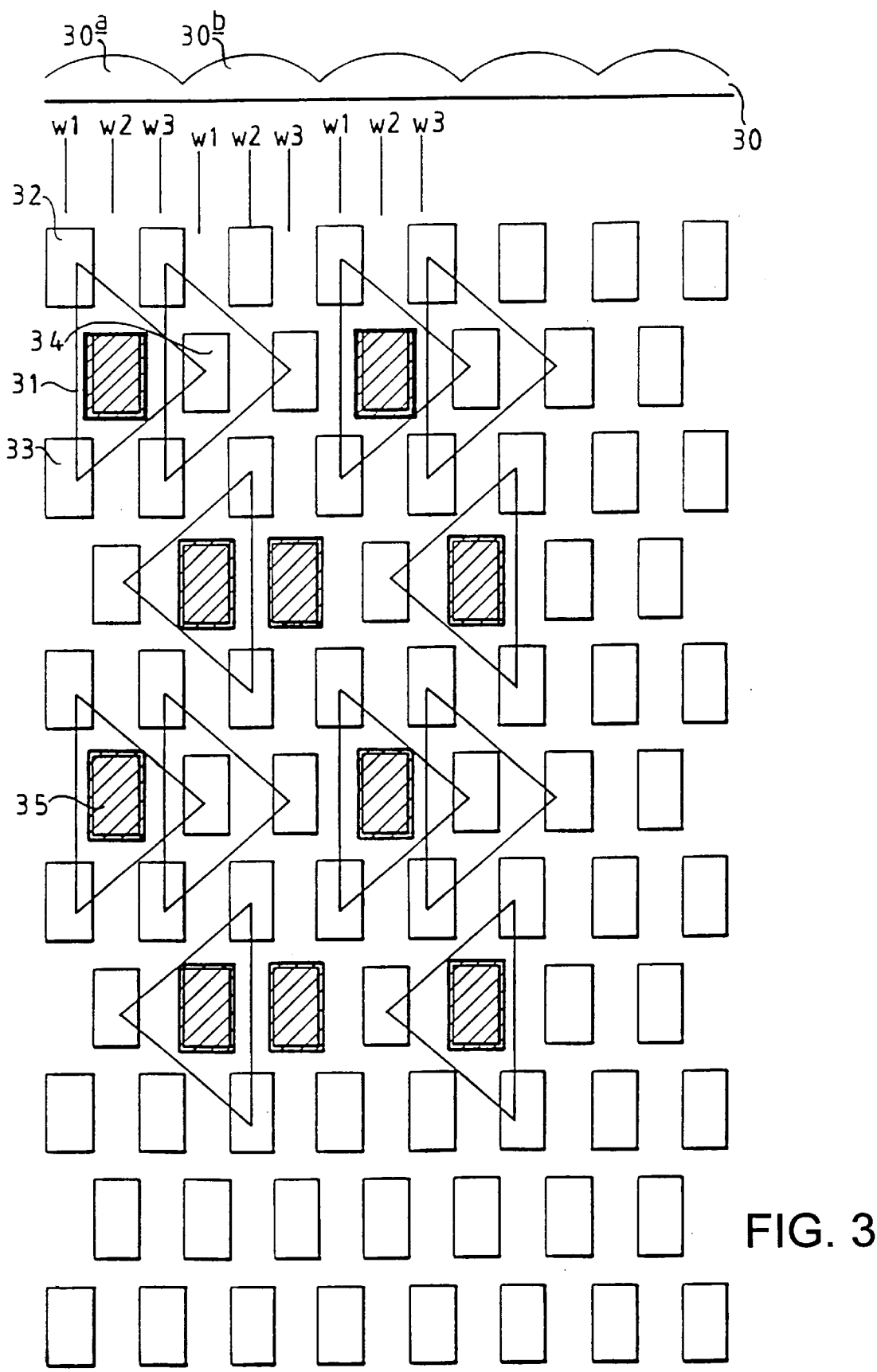
FIG. 3 illustrates part of a 3D autostereoscopic display constituting a third embodiment of the invention providing three windows with some unused pixels.

FIG. 3 illustrates diagrammatically the use of an LCD of the type shown in FIG. 1 or 2 in combination with a parallax element shown as a lenticular screen 30 having lenticules such as 30a and 30b Alternative parallax elements include parallax barriers, holograms and, for stereoscopic displays providing only two views, micropolariser elements (for instance as disclosed in EP 0 721 132). In the stereoscopic case, the micropolarisers are disposed in the same place as the view columns in the two view autostereoscopic case so that the colour information for each view has the same structure on the SLM.

In order to provide three views in three viewing windows, each lenticule (30a, 30b) of the lenticular screen 30 is aligned with three columns of pixels. The three columns of pixels aligned with each lenticule display strips of three different views indicated as w1, w2 and w3 which are imaged into three adjacent windows by the lenticular screen 30.

The columns of pixels under each of the lenticules of the lenticular screen 30 form a group such that the columns of each group are contiguous with each other in general, the columns are arranged as groups under respective lenticules such that each group comprises a number N of columns equal to the number of views to be provided by the 3D display. Although it is desirable for the columns of each group to be contiguous, and possibly also for the groups to be contiguous, this is not essential.

In order for each of the views w1, w2 and w3 to be displayed in full colour, the pixels which are grouped together to form each composite colour pixel must be located in pixel columns of the same windows. For instance, the triangle 31 indicates that pixels 32 and 33 from the column w1 aligned with the lenticule 30a are grouped with a pixel 34 in the column w1 aligned with the lenticule 30b. Thus, all three pixels 32 to 34 are disposed in columns w1 and are therefore imaged in the same window.

In the triangular tessellation shown in FIG. 3, some of the pixels such as 35 are not used and may be controlled so as to have the same appearance as non-display parts of the LCD. For instance, where a black matrix or mask is arranged-to cover regions between the pixels, the unused pixels 35 may be controlled so as to be opaque. Alternatively, the black mask may be extended during manufacture to cover such unused pixels, which need not then be addressed to any particular state. Although it may be preferable from the point of view of efficiency to utilise all of the pixels, it may be acceptable in many applications for some of the pixels to be unused.

Figure 4:
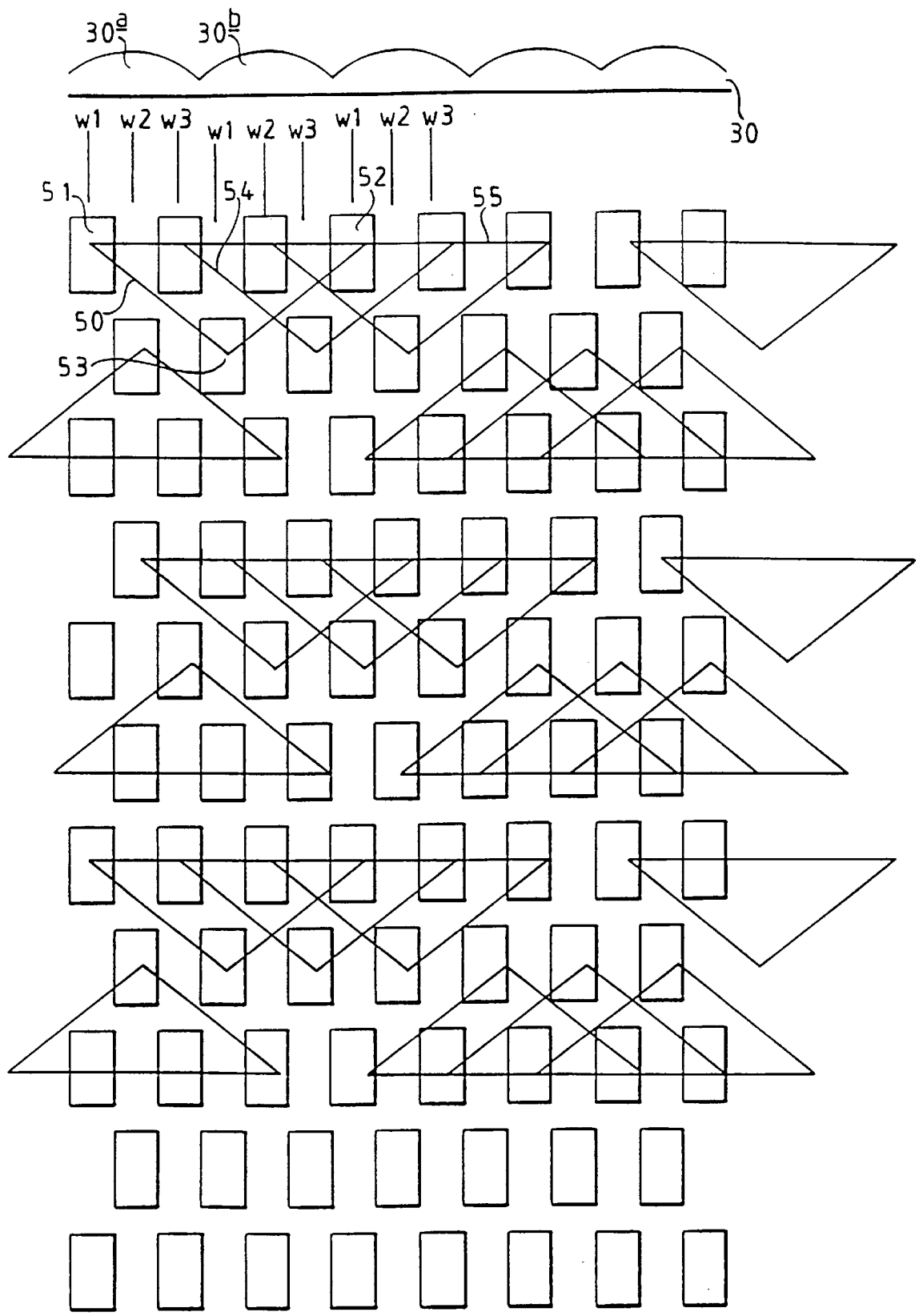
FIG. 4 illustrates a 3D autostereoscopic display constituting a fourth embodiment of the invention providing three windows.

FIGS. 4 to 16 illustrate LCDs which differ from the arrangement shown in FIG. 3 in the arrangement of the triangular tessellations so as to group the pixels into composite colour pixels. Thus, FIG. 4 illustrates a triangular tessellation in which all of the pixels are used. For instance, a triangle 50 illustrates that the pixels 51, 52 and 53 are grouped together to form a composite colour pixel. The pixels 51 and 52 are disposed in the same row but are spaced apart by six columns whereas the pixel 53 is in an adjacent row but is spaced from the pixels 51 and 52 by three columns. Thus, all of the pixels 51 to 53 are in w1 columns and are imaged by the lenticular screen 30 to the same window.

Figure 5:
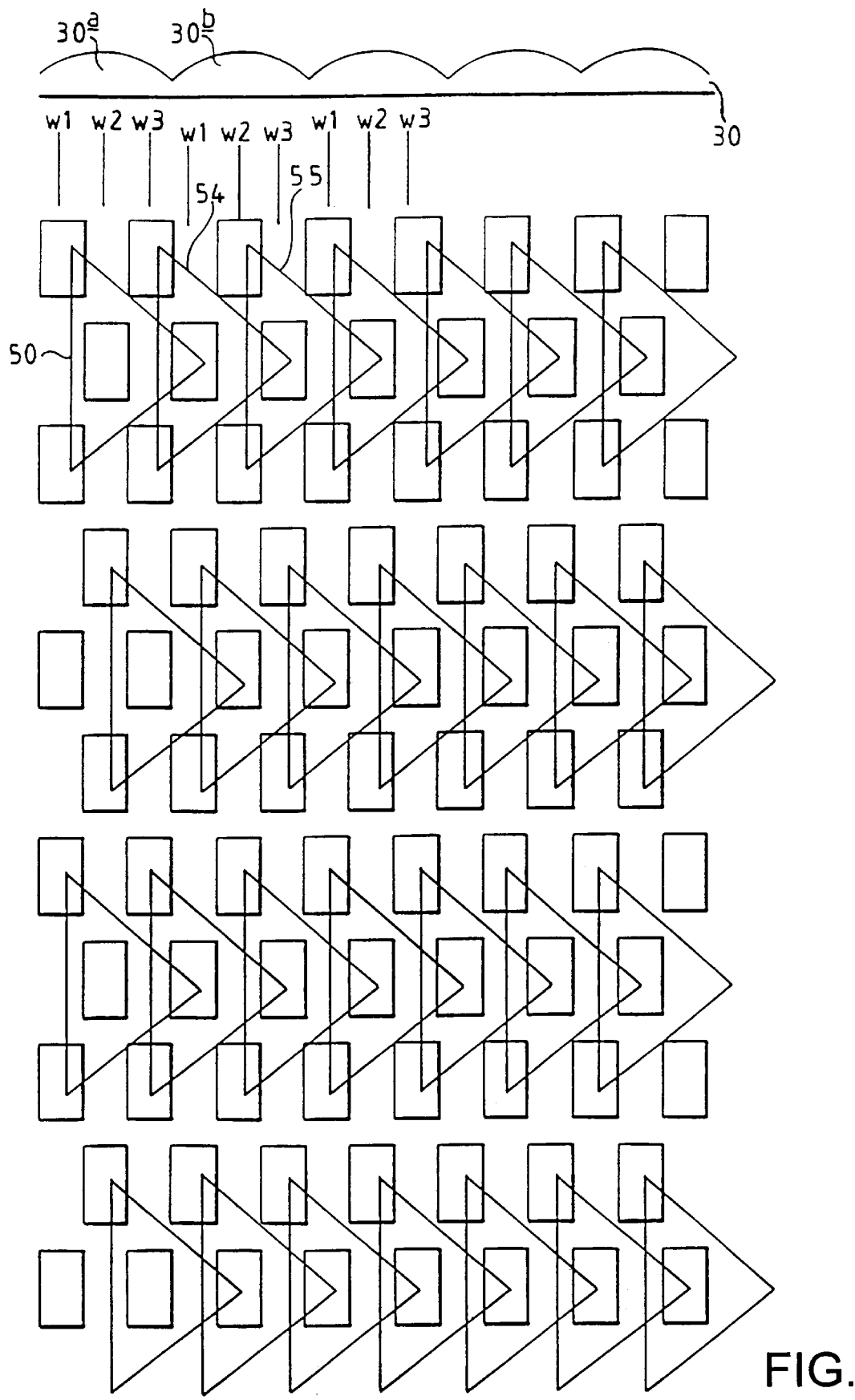
FIG. 5 illustrates part of a 3D autostereoscopic display constituting a fifth embodiment of the invention and providing three windows.

FIG. 5 illustrates another triangular tessellation in which there is no relative vertical displacement between composite colour pixels in different windows as indicated by the triangles 50, 54 and 55.

Figure 6:
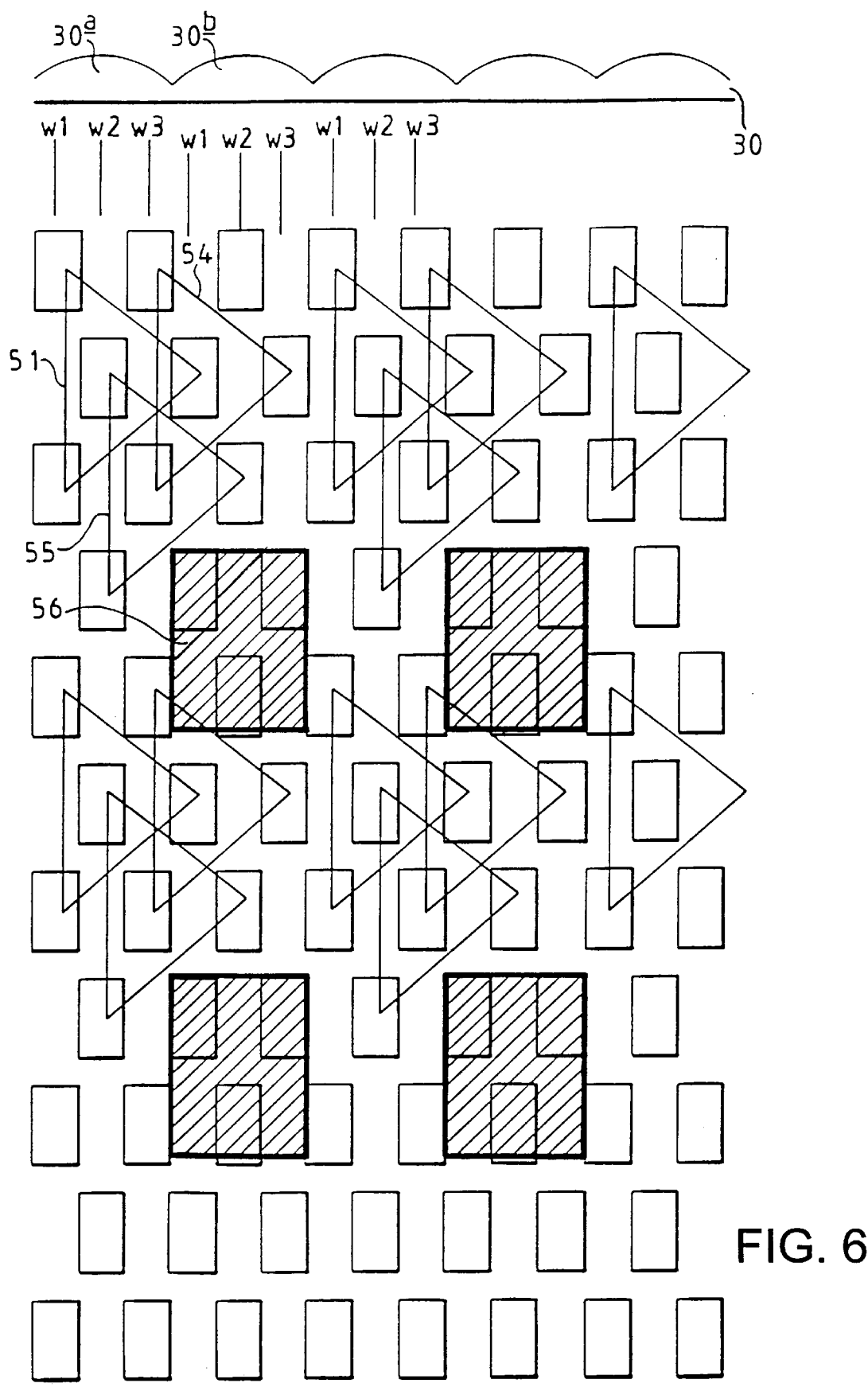
FIG. 6 illustrates part of a 3D autostereoscopic display constituting a sixth embodiment of the invention providing three windows with some unused pixels.

FIG. 6 illustrates an arrangement in which composite colour pixels indicated by triangles such as 55 for the view w2 are vertically shifted by one row with respect to the composite colour pixels of the views w1 and w3 indicated by triangles 51 and 54, respectively. Further, some pixels such as 56 are not used.

Figure 7:
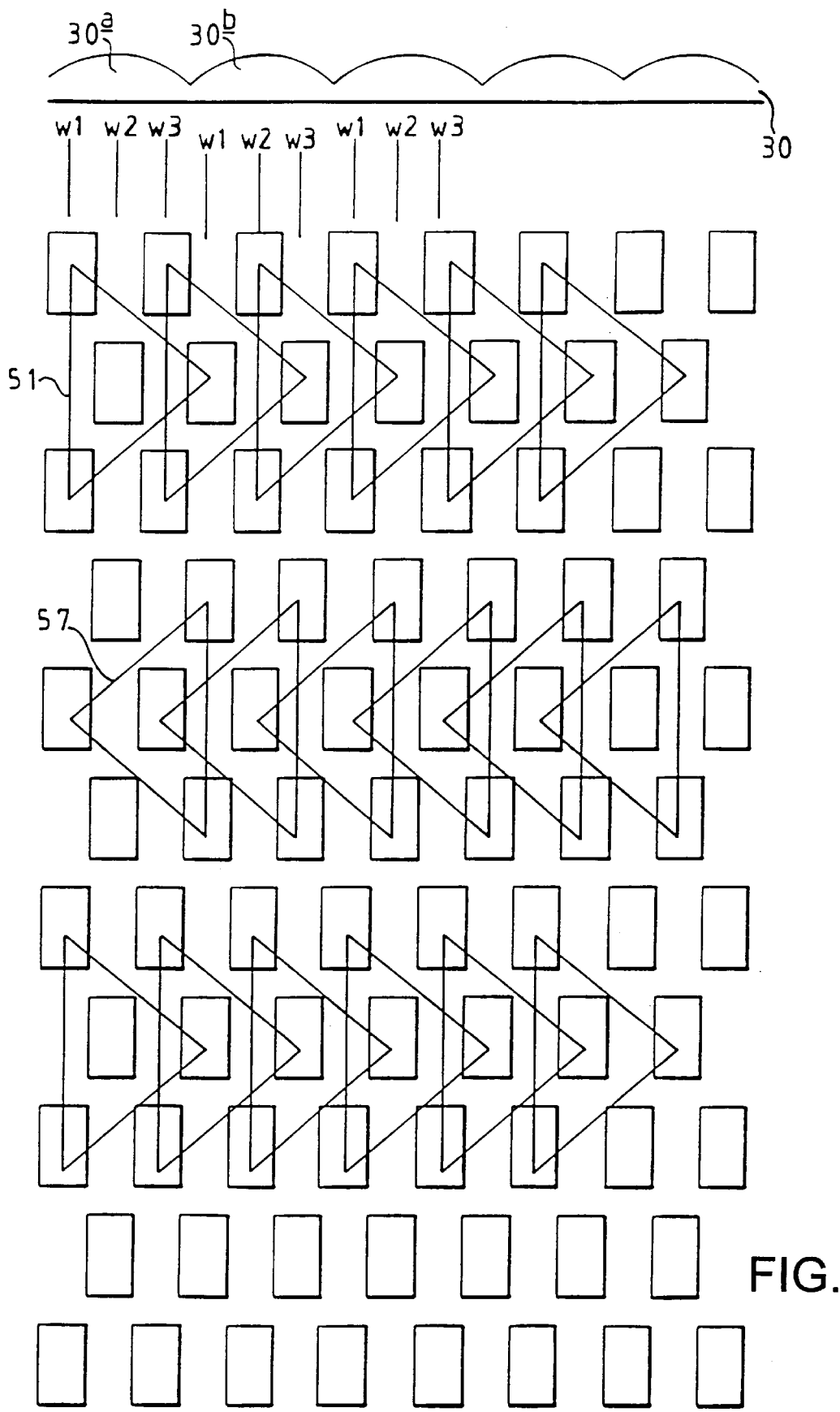
FIG. 7 illustrates part of a 3D autostereoscopic display providing three windows.

The arrangement shown in FIG. 7 differs from that shown in FIG. 5 in that the triangular tessellations for alternate rows of composite colour pixels are horizontally reversed, for instance as indicated by the triangles 51 and 57.

Figure 8:
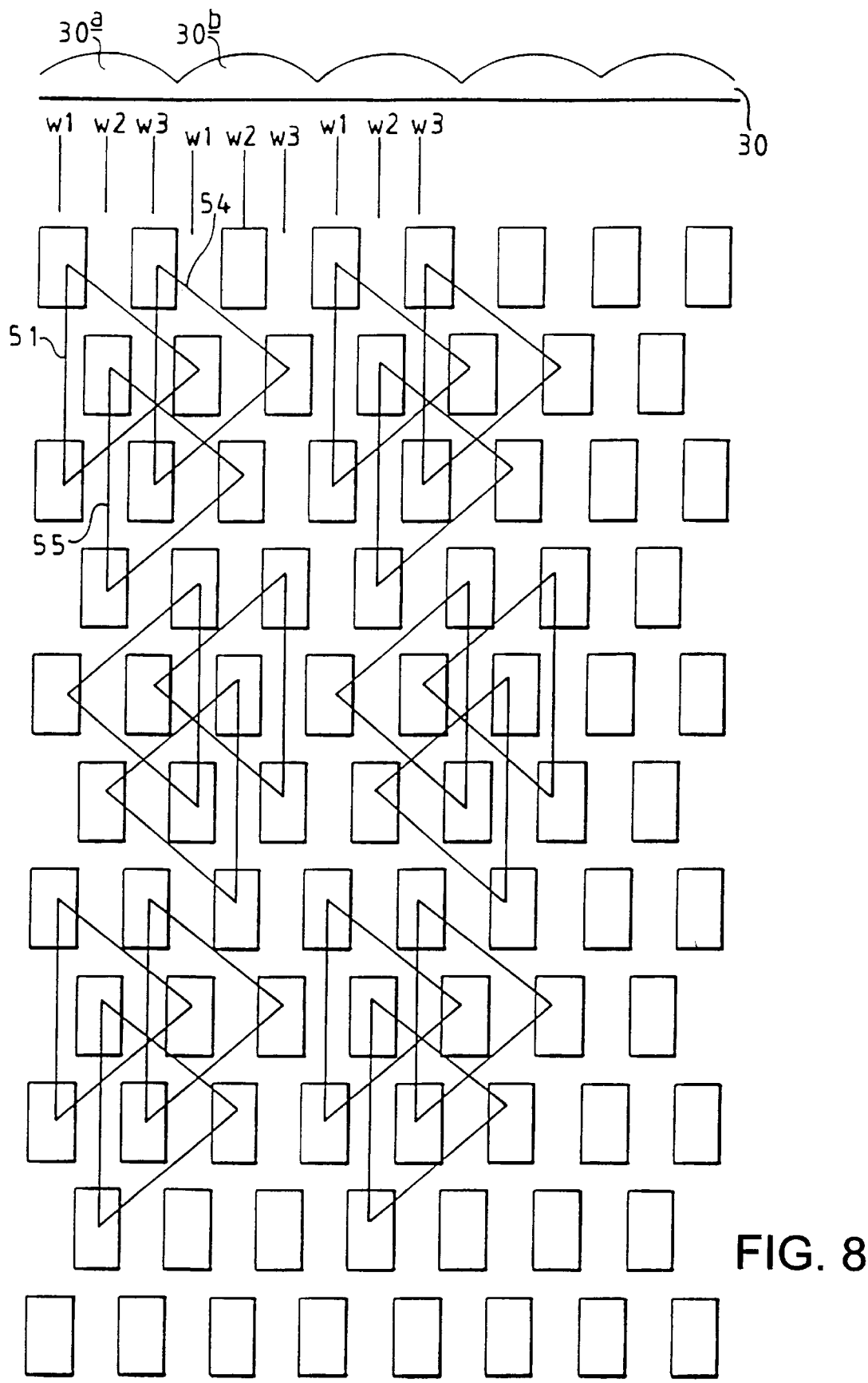
FIG. 8 illustrates part of a 3D autostereoscopic display constituting an eighth embodiment of the invention providing three windows.

The arrangement shown in FIG. 8 differs from that shown in FIG. 6 in that the triangular tessellations are reversed in alternate rows of composite colour pixels. This allows full utilisation of the pixels and reduces the vertical pitch of the composite colour pixels.

Figure 9:
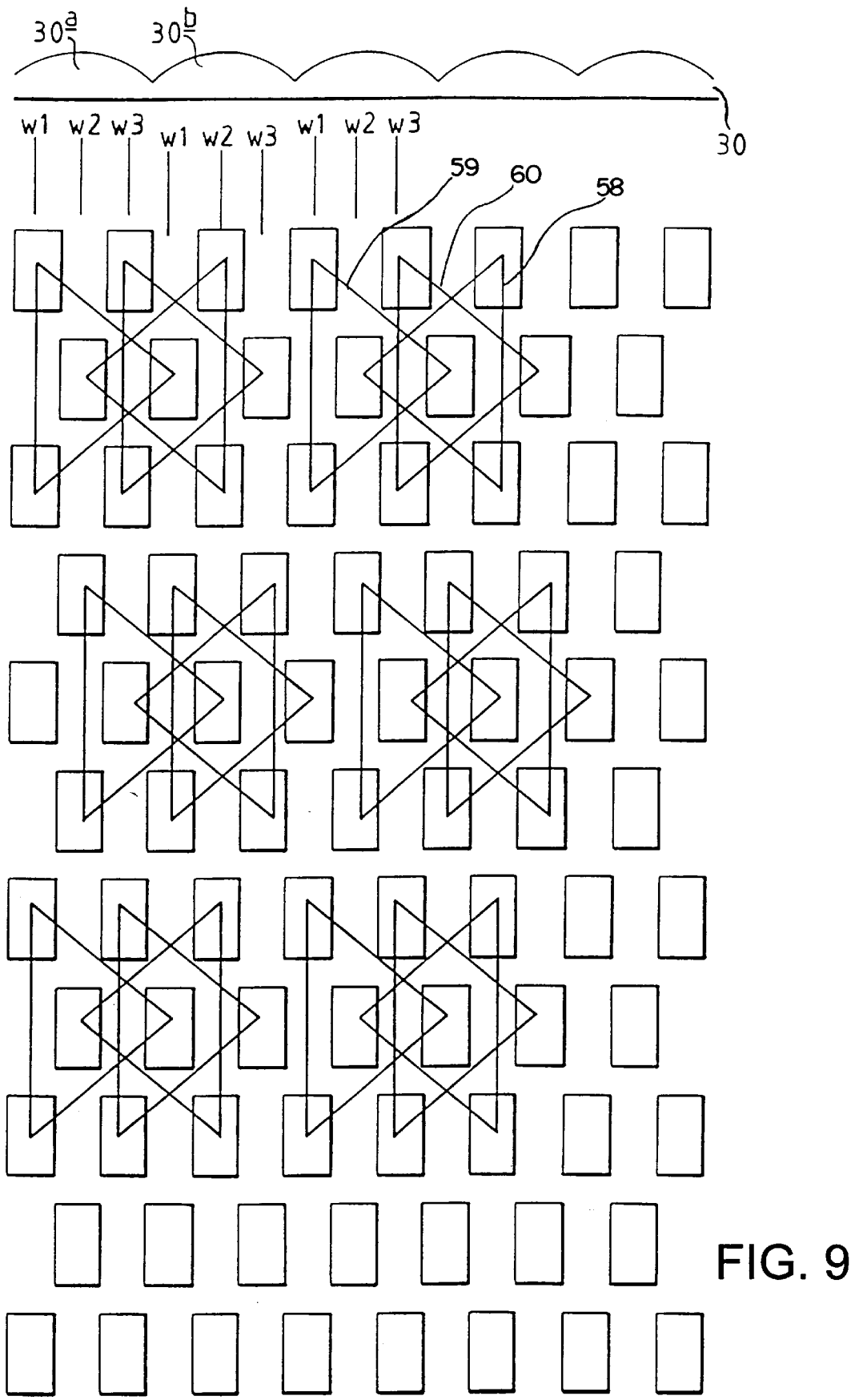
FIG. 9 illustrates part of a 3D autostereoscopic display constituting a ninth embodiment of the invention providing three windows.

The arrangement shown in FIG. 9 differs from that shown in FIG. 7 in that the triangular tessellations such as 58 for the view w2 are horizontally reversed with respect to the tessellations indicated by triangles 59 and 60 for the views w1 and w3, respectively.

Although FIGS. 3 to 9 illustrate LCDs for use in three window autostereoscopic displays, the LCDs may readily be arranged for use in autostereoscopic displays providing other numbers of windows. The tessellations are required to be such that the pixels which comprise each composite colour pixel are always selected from members of the sets of pixels which, because of their positions with respect to the parallax generating elements, are imaged to the same window.

Super twisted nematic (STN) passive matrix LCDs are prone to image dependent cross-talk which may be disadvantageous when used in 3D applications where low cross-talk between windows is important. In particular, cross-talk between windows appears as a ghost image which can reduce or even destroy the 3D effect. However, cross-talk between composite colour pixels of the same window or between pixels of the same composite colour pixel is less of a problem with regard to the 3D effect. Various techniques are known for reducing cross-talk in STN passive matrix LCDs and these may be applied together with pixel tessellation and colour filter arrangements for minimising cross-talk between windows i.e. inter-window cross-talk can be minimised at the expense of intra-window cross-talk. Intra-window cross-talk results in colour mixing in the display. Methods of reducing cross-talk in passive matrix displays include mufti-line addressing.

Figure 12:
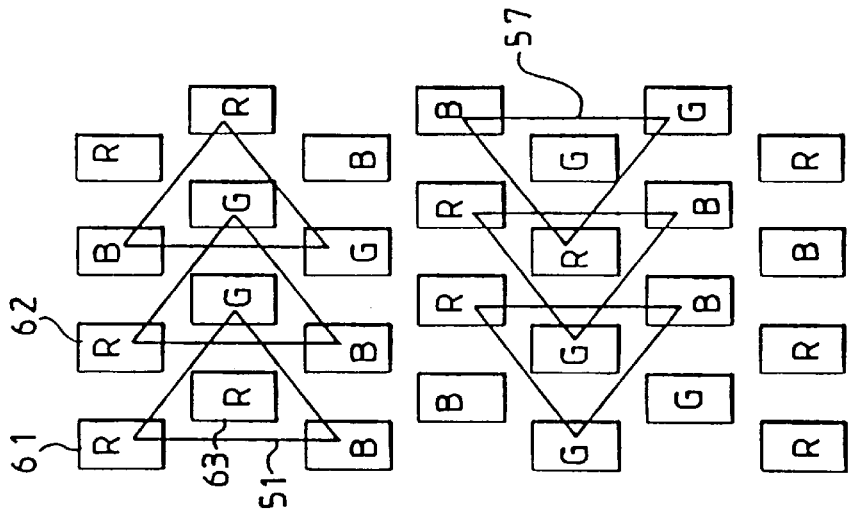
FIGS. 10 to 12 illustrate different colour filter arrangements for SLMs constituting embodiments of the invention.
Figure 11:
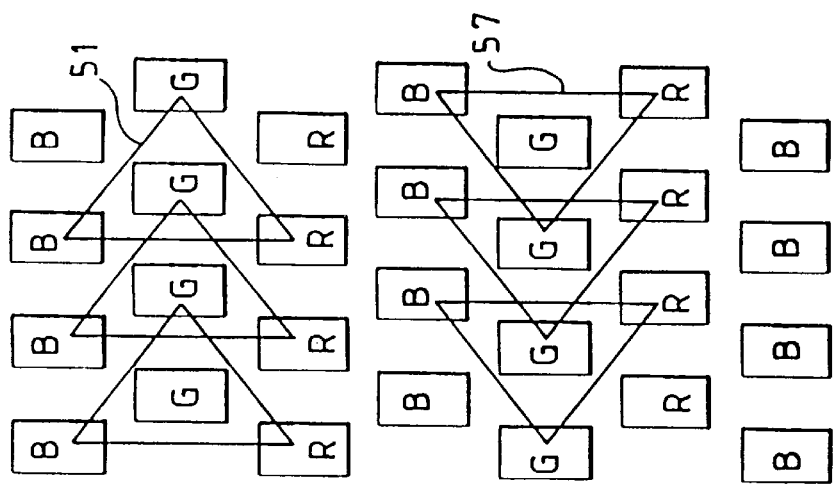
Figure 10:
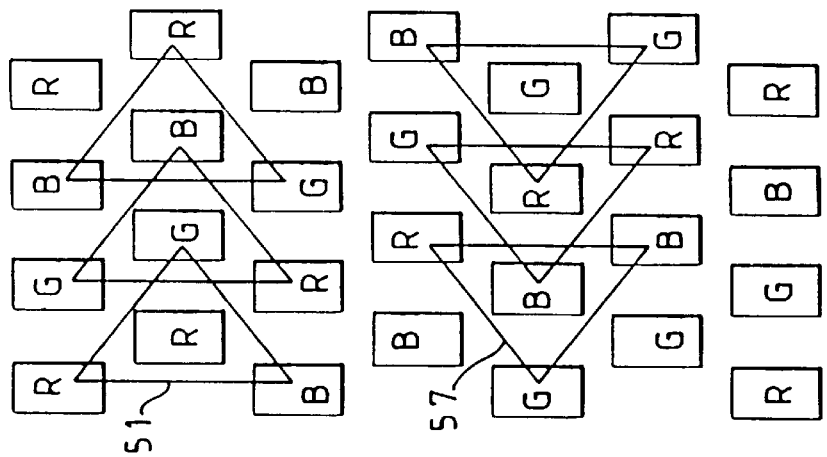

FIGS. 10 to 12 illustrate that different colour patterns may be used with the same triangular tessellations shown in FIGS. 3 to 19 so as to form composite colour pixels. In particular, FIGS. 10 to 12 illustrate different colour filter arrangements for the triangular tessellation illustrated in FIG. 7. FIG. 10 illustrates a striped colour filter having a repeating pattern of RGB stripes, each stripe of which is aligned with a single diagonal line of pixels, FIG. 11 illustrates the use of horizontally striped colour filters with each colour stripe being aligned with a single horizontal row of pixels. FIG. 12 illustrates the use of a colour filter having an array of filter regions, each of which is aligned with three adjacent pixels such as those indicated at 61, 62 and 63.

The LCDs described hereinbefore are of the RGB type in which each composite colour pixel comprises a single red pixel, a single green pixel and a single blue pixel. However, other combinations are possible and FIGS. 13 to 22 illustrate LCDs in which each composite colour pixel comprises a single red pixel, a single blue pixel, and two green pixels (RGGB). Such an arrangement allows the perceived resolution of the LCD to be improved. In particular, the visual resolution of the human eye in the green region of the visible spectrum is greater than for the red and blue regions so that, by increasing the "green resolution" of the LCD, the perceived resolution is greatly increased at the penalty of increasing the number of pixels by one third compared with the arrangements shown in FIGS. 3 to 12.

Figure 37:
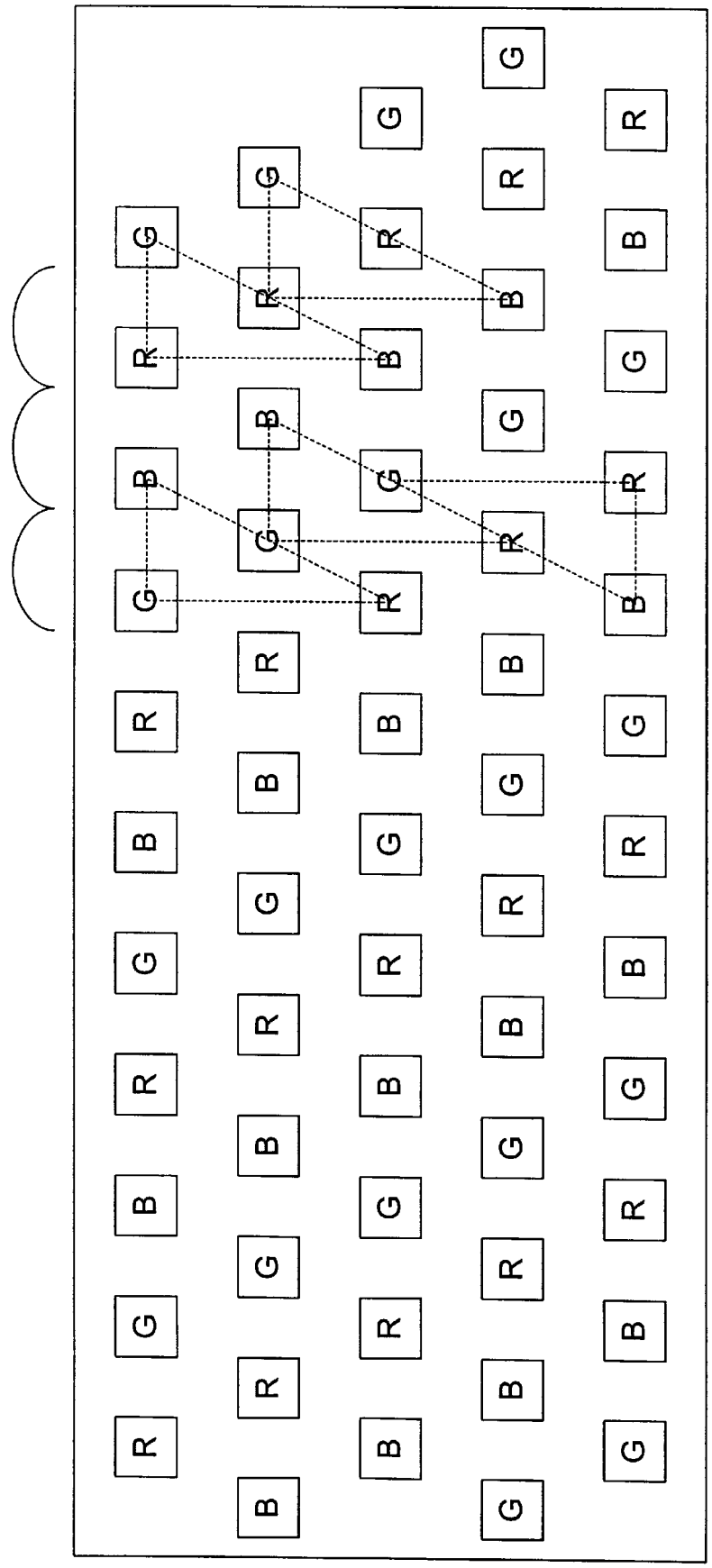
FIG. 37 illustrates part of a 3D autostereoscopic display providing two windows.
Figure 38:
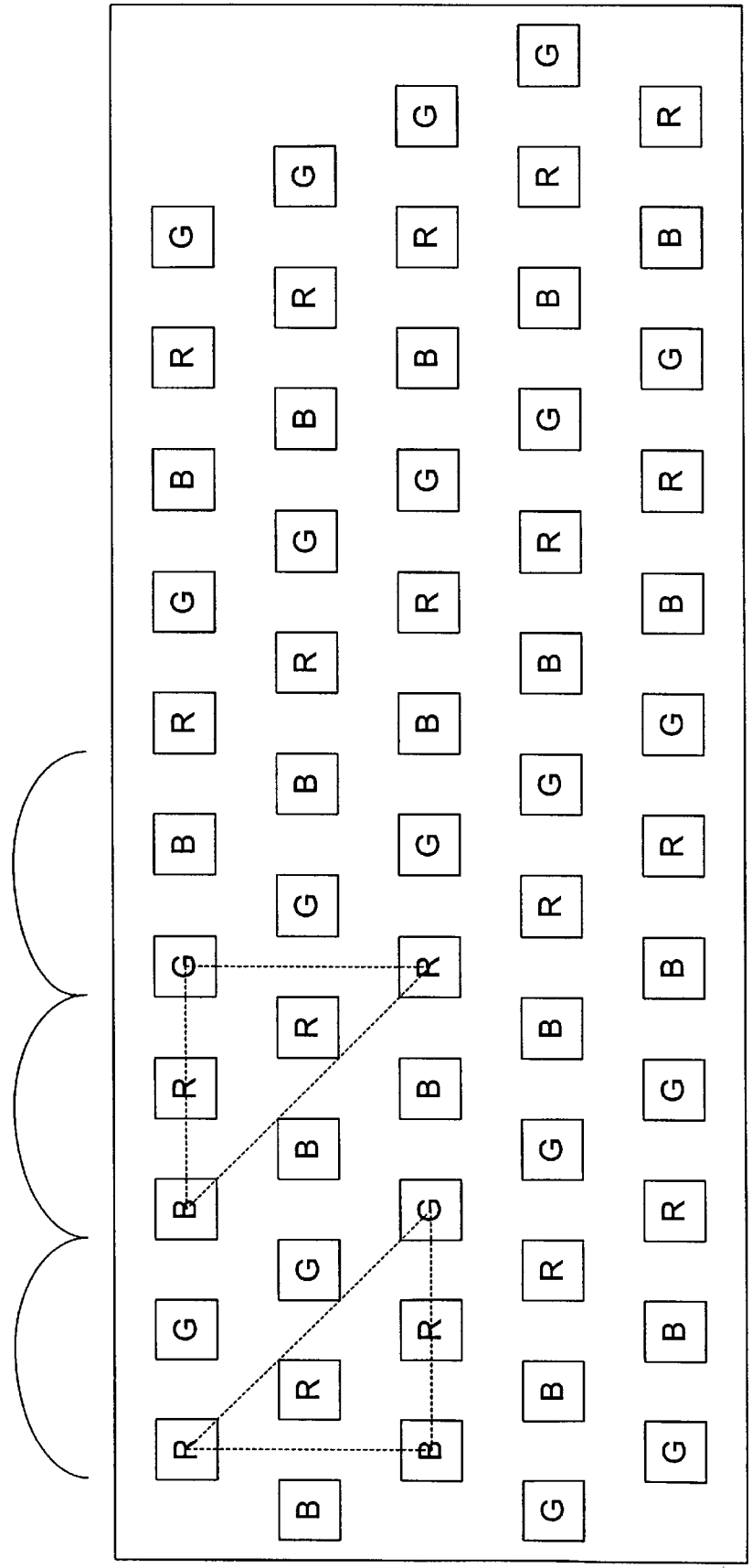
FIG. 38 illustrates part of a 3D autostereoscopic display providing four windows.

The pixel and colour filter arrangement of the triangular tessellations for three windows configurations are explained with reference to FIGS. 1 to 12. However, the triangular tessellations are not limited to three windows configurations. The pixel and colour filter arrangement of the triangular tessellations for two and four window configurations are shown in FIGS. 37 and 38, respectively.

Figure 39:
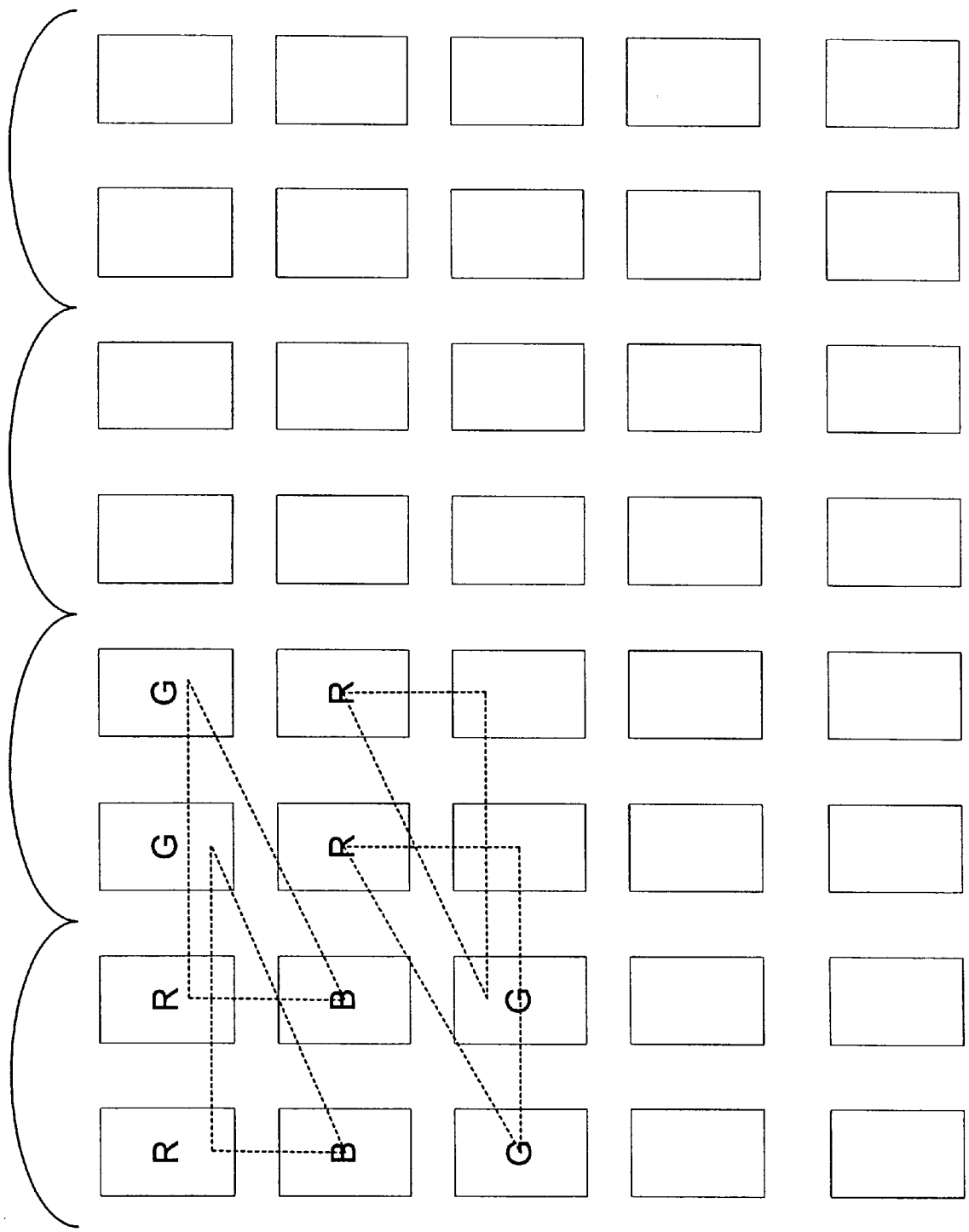
FIG. 39 illustrates part of a 3D autostereoscopic display providing two windows.
Figure 40:
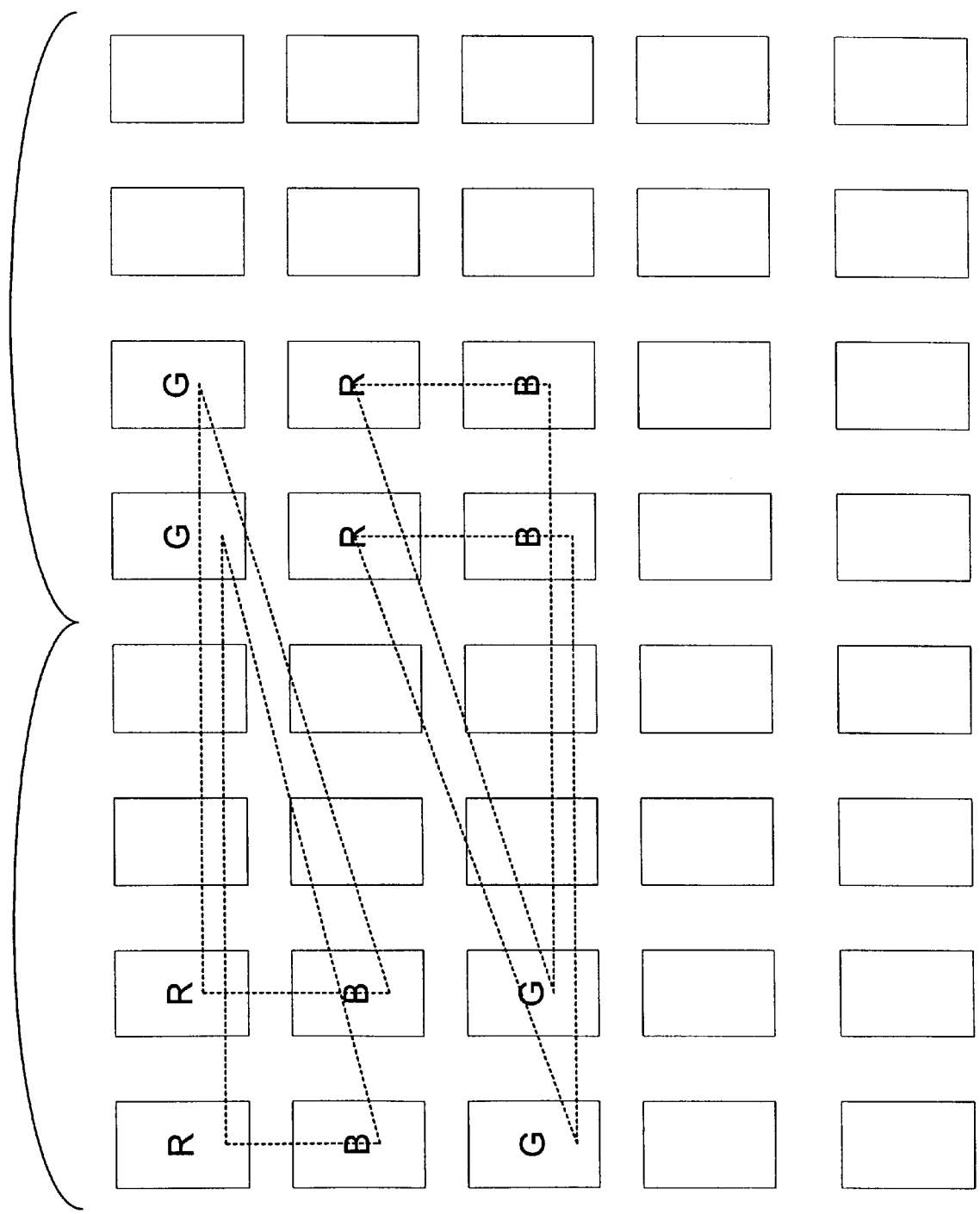
FIG. 40 illustrates part of a 3D autostereoscopic display providing four windows.

FIGS. 39 and 40 illustrate RGB configurations for stripe panels using appropriate tessellations, which are designed for two and four windows configurations, respectively.

The use of RGGB pixels (and RGYB pixels as described hereinafter) is particularly important in 3D spatially multiplexed displays as resolution is at a premium because the pixels have to be used to produce at least a left eye and a right eye image. Any technique which increases the effective display resolution will be at a premium.

Figure 13:
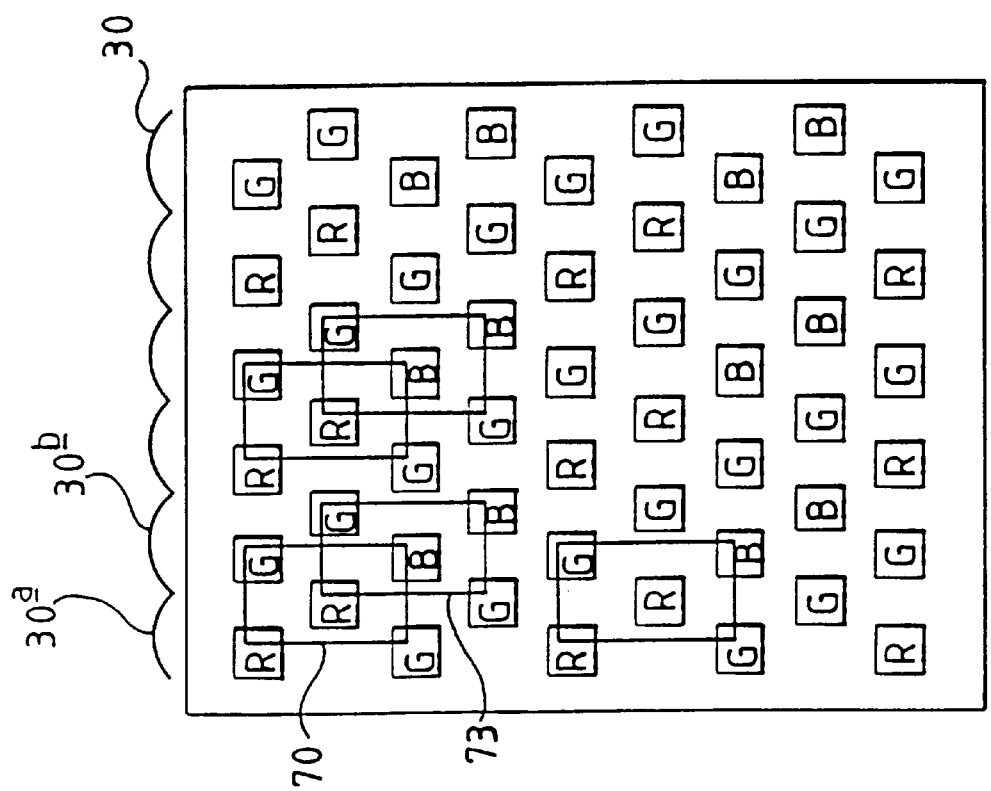
FIG. 13 illustrates part of a 3D autostereoscopic display constituting a tenth embodiment of the invention providing two windows and using an SLM of the RGGB type.
Figure 16:
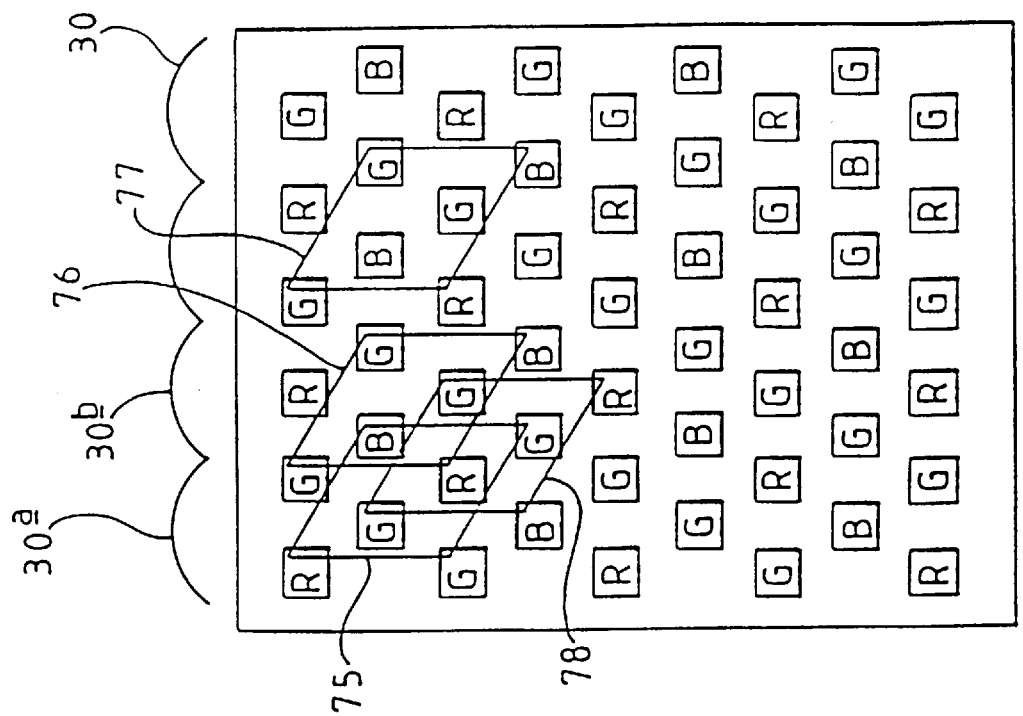
FIG. 16 illustrates part of a 3D autostereoscopic display constituting a thirteenth embodiment of the invention providing three windows and incorporating an SLM of the RGGB type.

FIG. 13 illustrates the pixel and colour filter arrangement of an LCD which cooperates with a lenticular screen 30 to form a two view autostereoscopic 3D display. The composite colour pixels are formed by a rectangular tessellation i.e. the pixels of each composite pixel are disposed at the corners or apices of a rectangle (a type of four-sided polygon) such as 70. The composite pixel 70 is imaged by the lenticular screen 30 to the first window whereas the composite pixel 73 is imaged to the second window. Each row and column of view data has a green component, thus significantly improving device resolution as the green (luminance information bearing) pixels are uniformly distributed. In the RGYB case described hereinafter, each column and row contains C and/or Y pixels.

Figure 14:
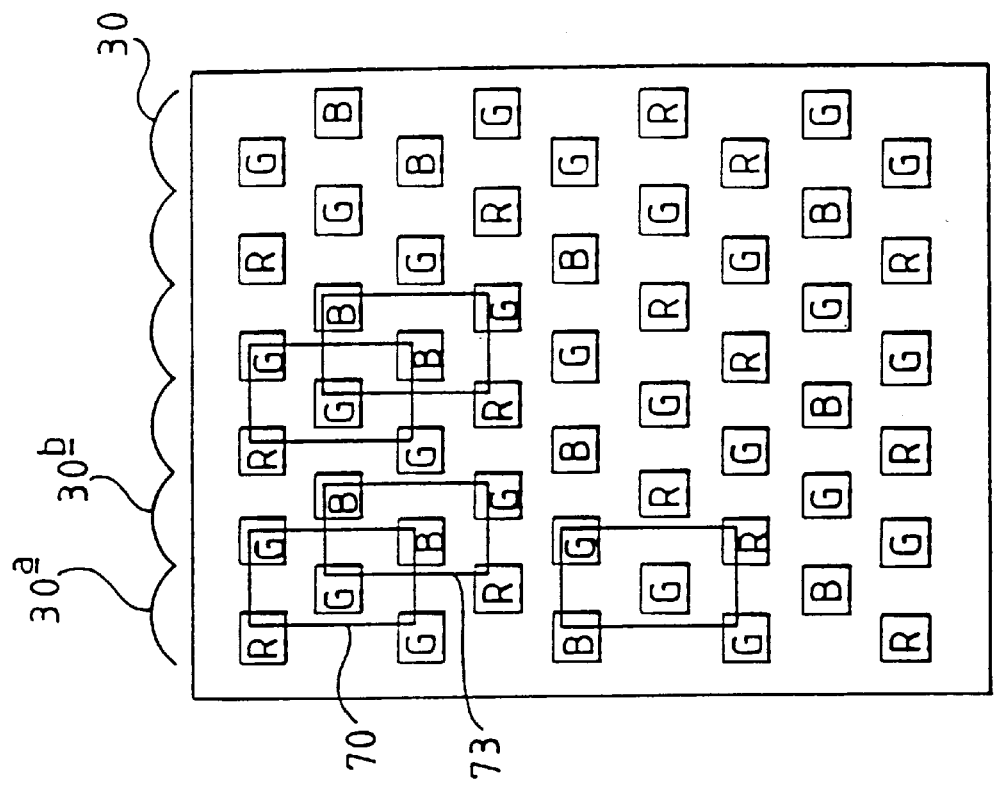
FIG. 14 illustrates part of a 3D autostereoscopic display constituting an eleventh embodiment of the invention providing two windows and including an SLM of the RGGB type.

The LCD shown in FIG. 14 makes use of the same rectangular tessellation as shown in FIG. 13 but has a different colour filter arrangement so that the layout of the RGGB pixels is different.

Figure 15:
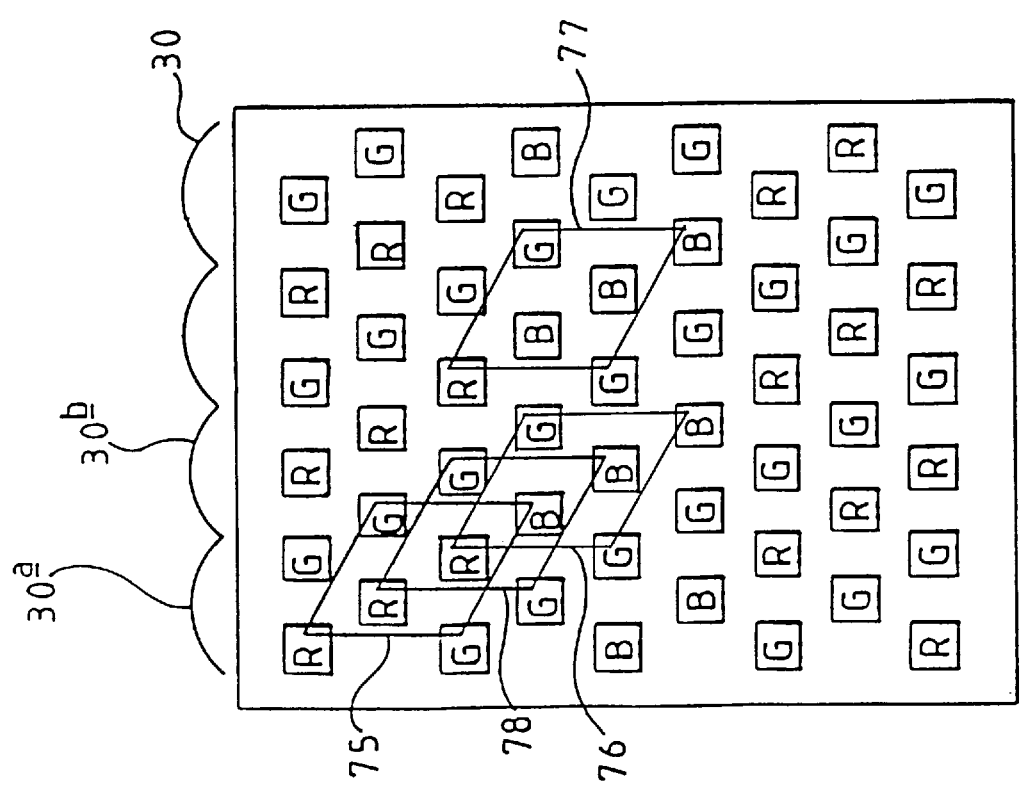
FIG. 15 illustrates part of a 3D autostereoscopic display constituting a twelfth embodiment of the invention providing three windows and incorporating an SLM of the RGGB type.

FIG. 15 illustrates the use of an RGGB display of the type shown in FIGS. 13 and 14 to provide a three window display. In this case, the tessellations are parallelograms (another type of four-sided polygon). for instance as shown at 75 to 78. The tessellations 75, 78 and 76 display information for views 1, 2 and 3, respectively The LCD shown in FIG. 16 differs from that shown in FIG. 15 in that a different colour filter arrangement is provided. Similarly, the LCD of FIG. 17 differs from that of FIG. 15 in that a different colour filter arrangement is provided and the parallelogram tessellations are horizontally reversed with respect to those of FIG. 15.

Figure 18:
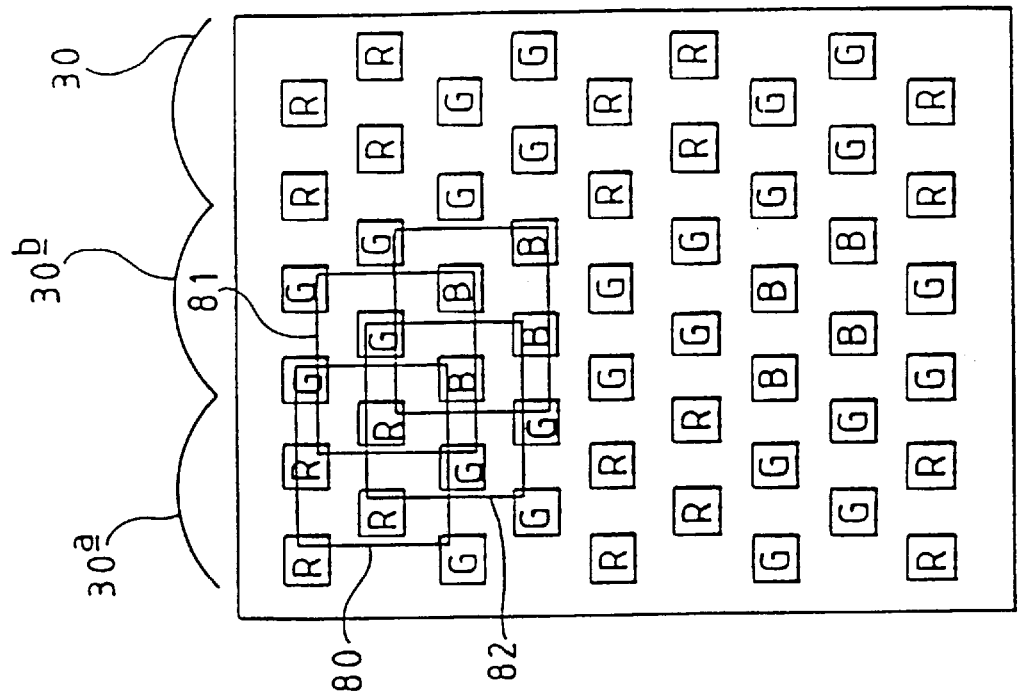
FIG. 18 illustrates part of a 3D autostereoscopic display constituting a fifteenth embodiment of the invention providing four windows and including an SLM of the RGGB type.
Figure 17:
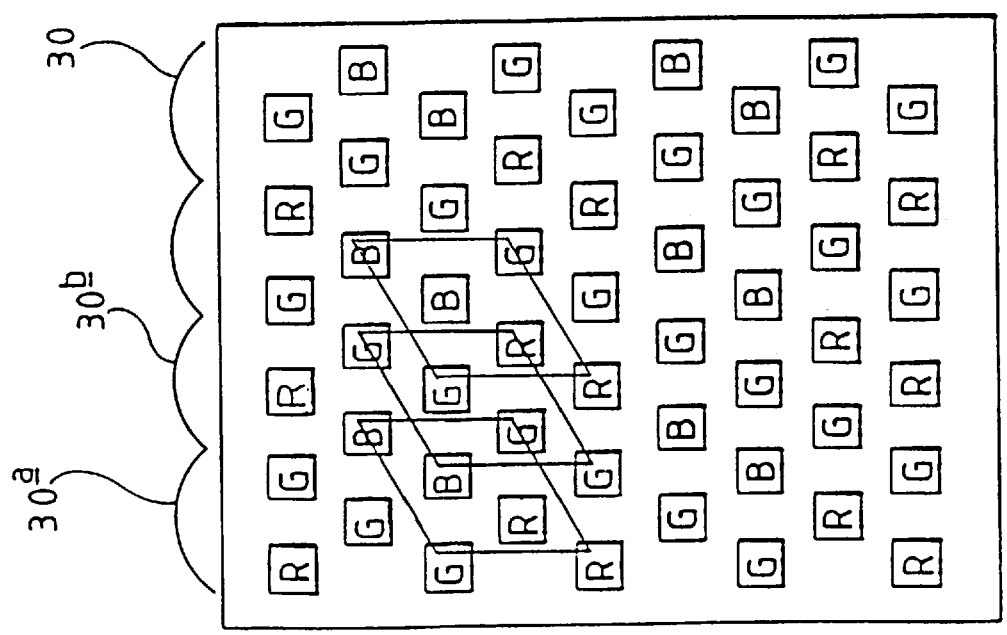
FIG. 17 illustrates part of a 3D autostereoscopic display constituting a fourteenth embodiment of the invention providing three windows and incorporating an SLM of the RGGB type.

FIG. 18 illustrates an RGGB LCD of the type shown in FIG. 13 for providing a four window autostereoscopic 3D display and having rectangular tessellations such as 80 to 82.

Figure 20:
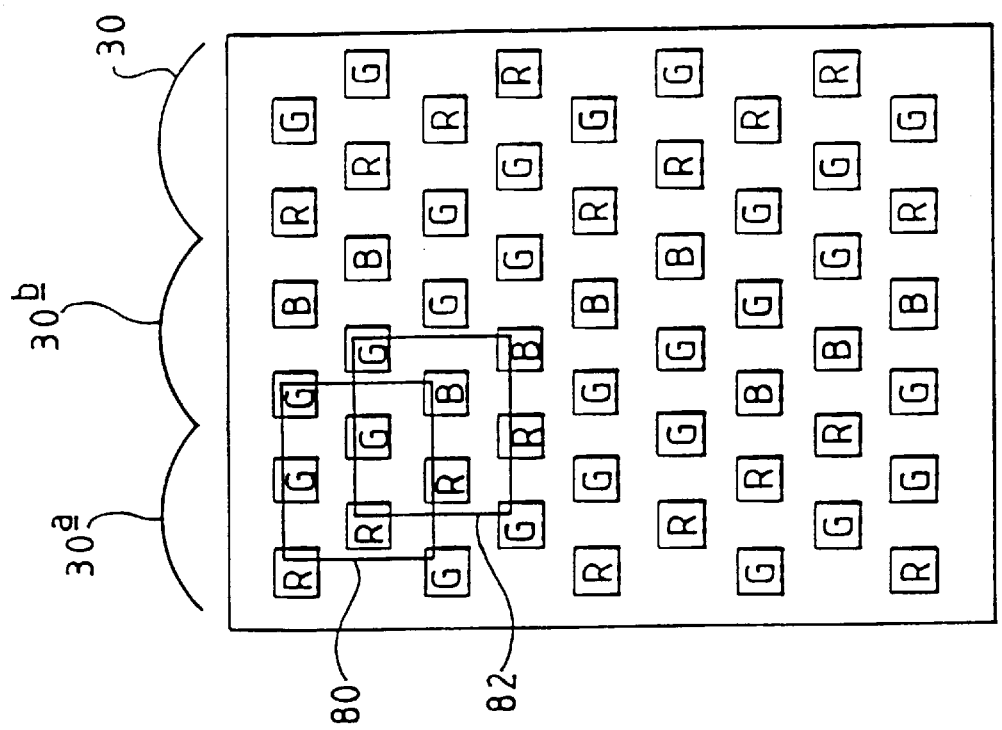
FIG. 20 illustrates part of a 3D autostereoscopic display constituting a seventeenth embodiment of the invention providing four windows and including an SLM of the RGGB type.
Figure 19:
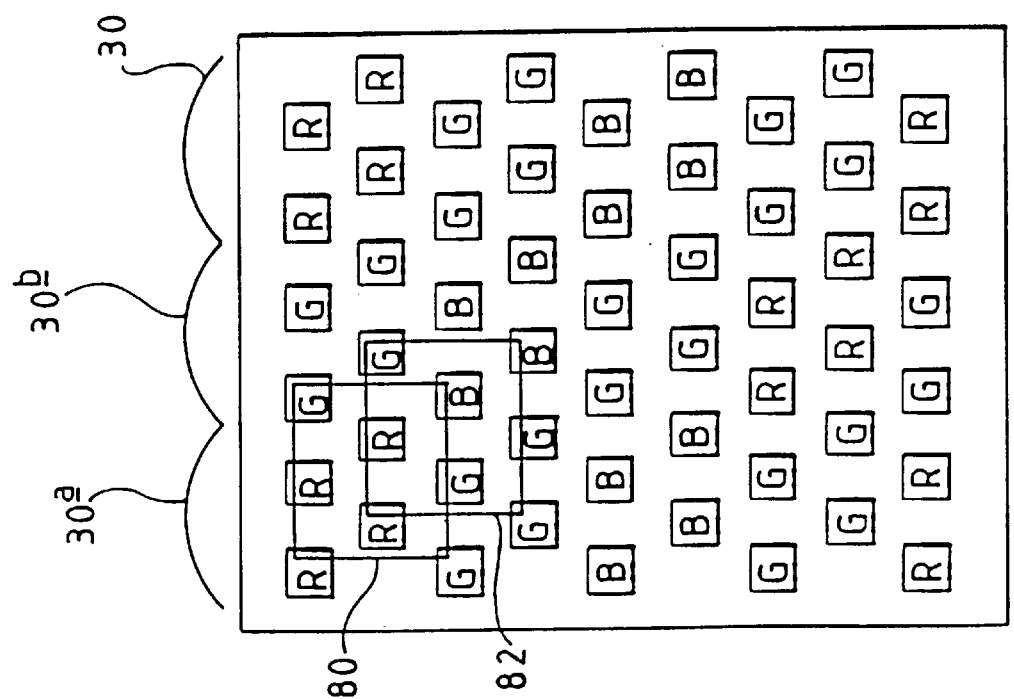
FIG. 19 illustrates part of a 3D autostereoscopic display constituting a sixteenth embodiment of the invention providing four windows and including an SLM of the RGGB type.

FIGS. 19 and 20 illustrate further colour filter arrangements for use with the rectangular tessellations illustrated in FIG. 18 to provide four view autostereoscopic 3D displays.

Figure 22:
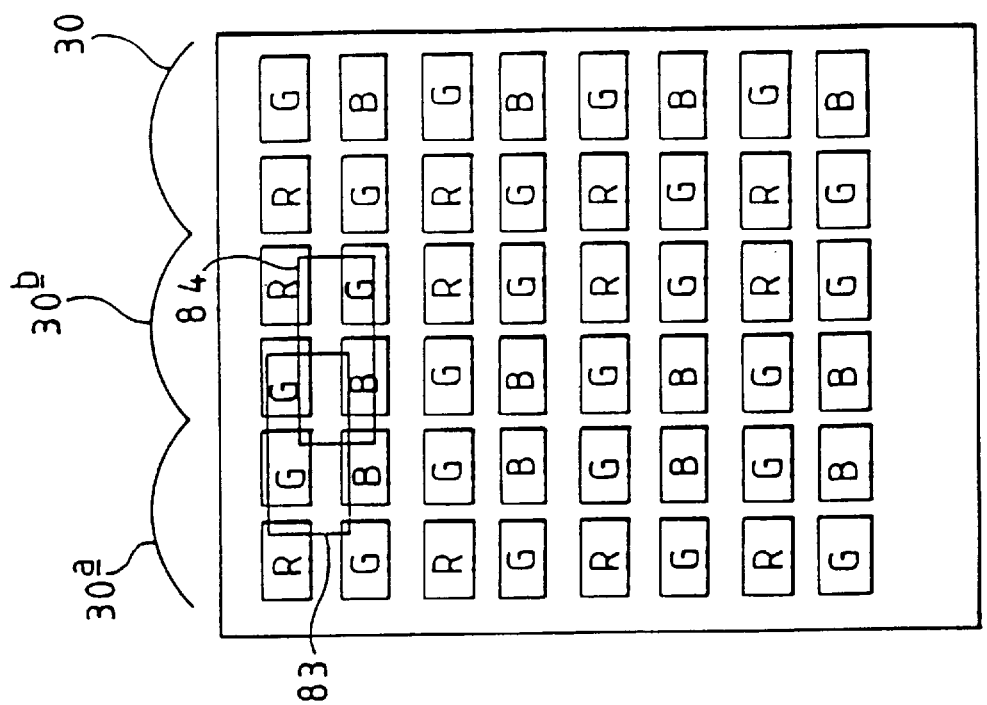
FIG. 22 illustrates part of a 3D autostereoscopic display constituting an nineteenth embodiment of the invention providing two windows and including an SLM of the RGGB type.
Figure 21:
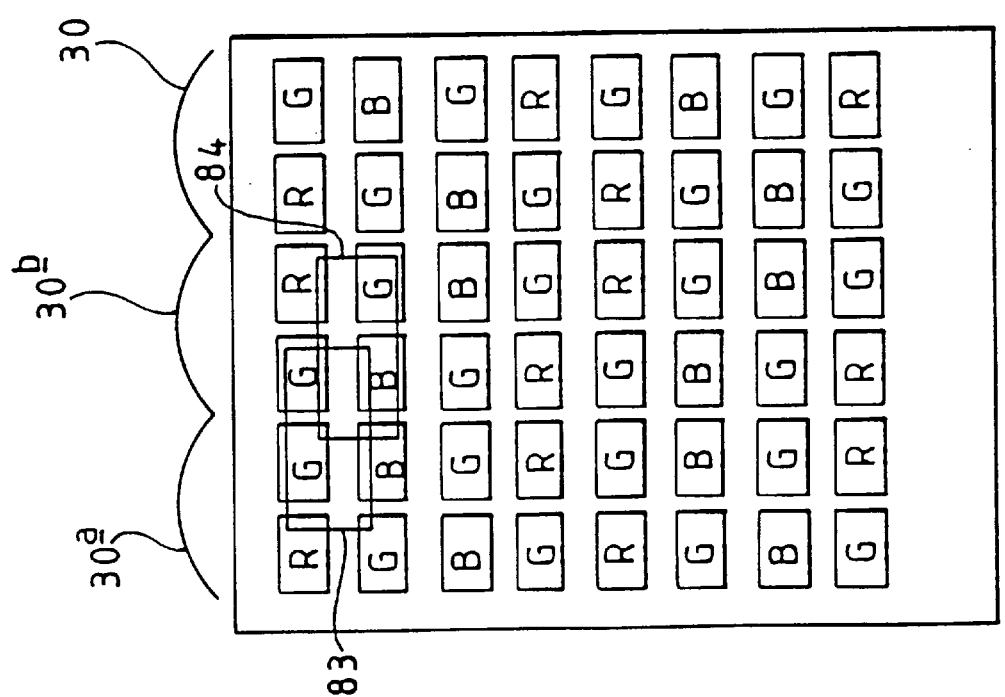
FIG. 21 illustrates part of a 3D autostereoscopic display constituting an eighteenth embodiment of the invention providing two windows and including an SLM of the RGGB type.

The LCDs described hereinbefore are all of the type which are disclosed in EP 0 625 861 for providing contiguous viewing windows in autostereoscopic 3D displays. However, similar colour tessellations may be provided in other types of LCDs and this is illustrated in FIGS. 21 and 22 which show arrangements of pixels such that columns and rows are separated from each other by a black mask so that image windows produced by the lenticular screen 30 are not contiguous but are separated by dark regions. Rectangular tessellation 83 and 84 of RGGB pixels form the composite colour pixels such that the pixels of each tessellation are imaged to the same viewing window by the lenticular screen 30. FIGS. 21 and 22 show two different colour filter arrangements for such an LCD.

The LCDs shown in FIGS. 23 to 29 differ from those shown in FIGS. 13 to 22 in that the composite colour pixels comprise RGYB pixels i.e. one of the green pixels of the composite colour pixels shown in FIGS. 13 to 22 is replaced by a luminance or Y pixel having substantially no colour filter. Such an arrangement provides enhanced perceived resolution and increased brightness. Each column and row contains G and/or Y pixels for optimum performance.

Figure 24:
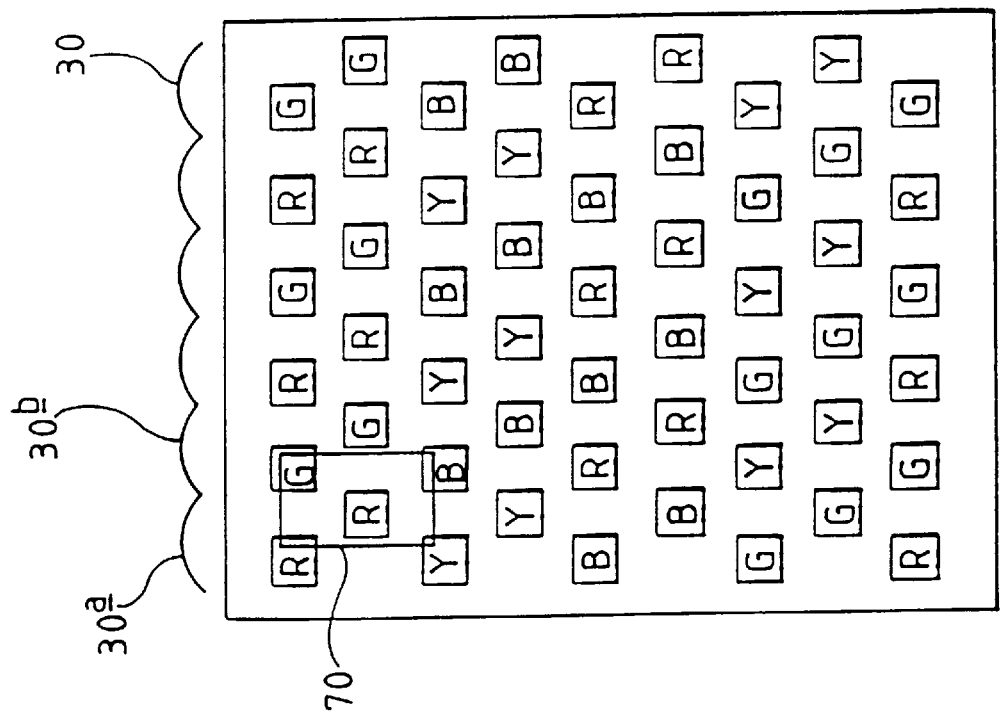
FIG. 24 illustrates part of a 3D autostereoscopic display constituting a twenty first embodiment of the invention providing two windows and using an SLM of the RGYB type.
Figure 23:
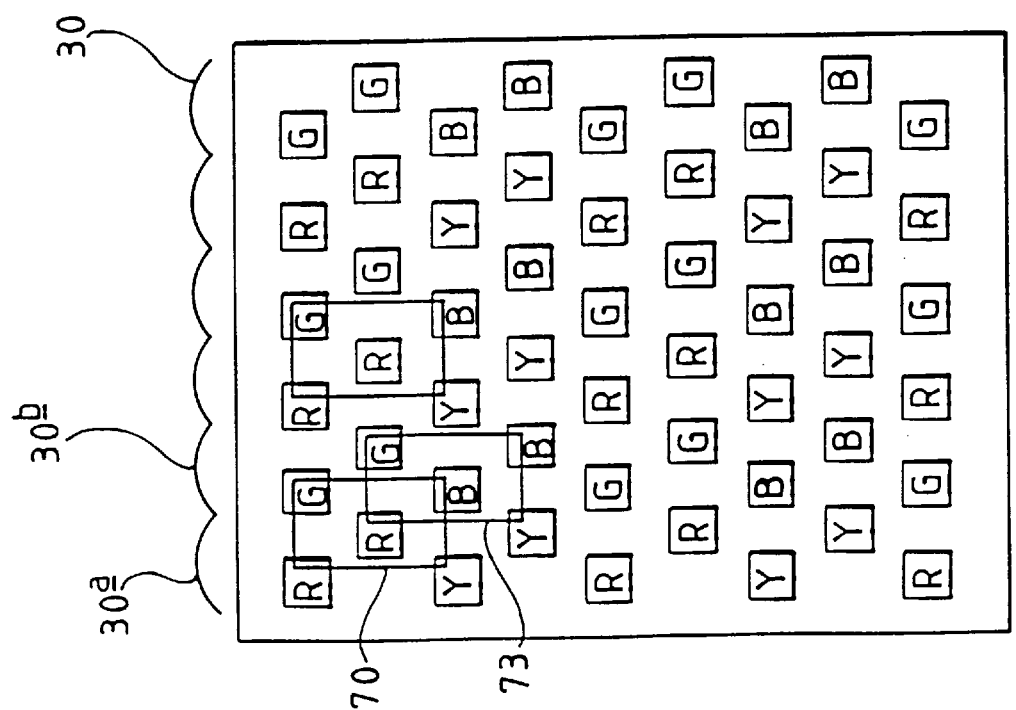
FIG. 23 illustrates part of a 3D autostereoscopic display constituting a twentieth embodiment of the invention providing two windows and using an SLM of the RGYB type.
Figure 26:
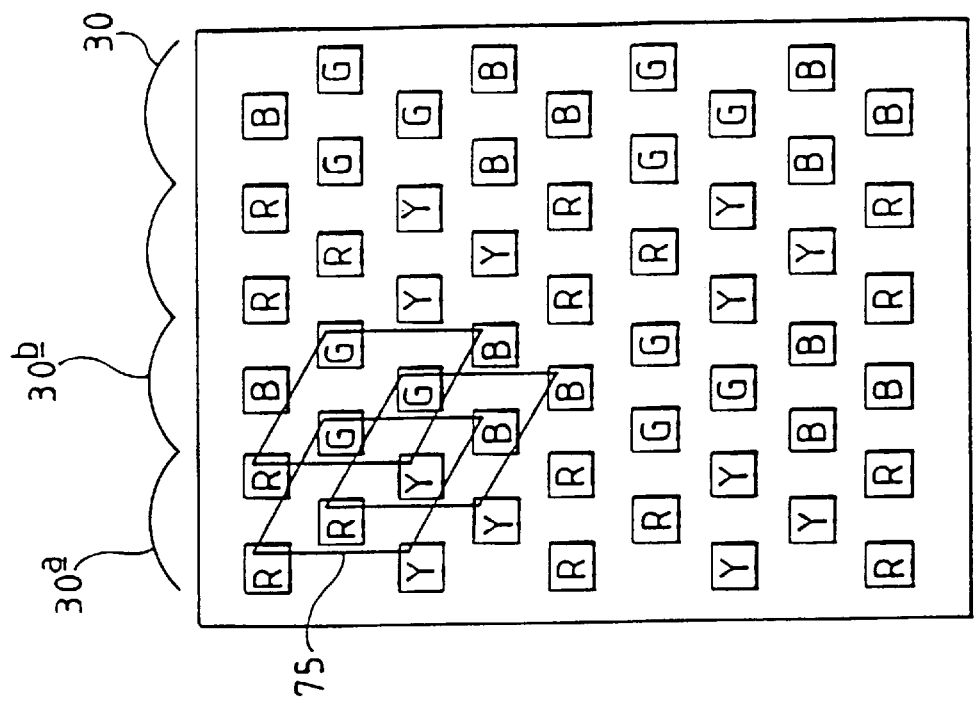
FIG. 26 illustrates part of a 3D autostereoscopic display constituting a twenty third embodiment of the invention providing three windows and using an SLM of the RGYB type.
Figure 25:
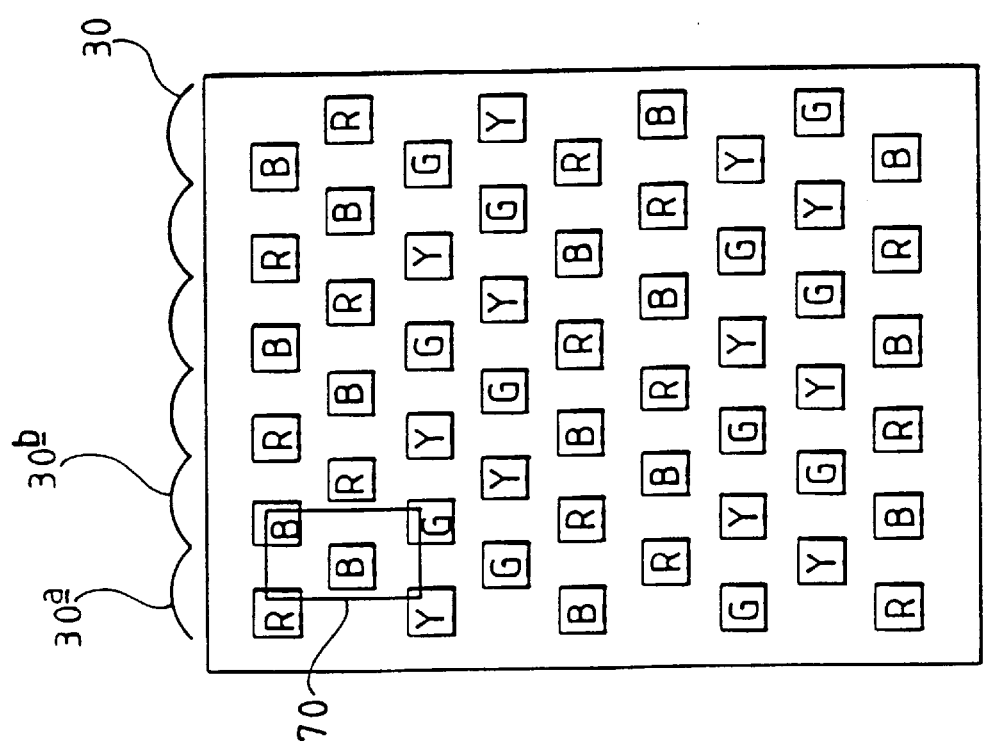
FIG. 25 illustrates part of a 3D autostereoscopic display constituting a twenty second embodiment of the invention providing two windows and using an SLM of the RGYB type.
Figure 27:
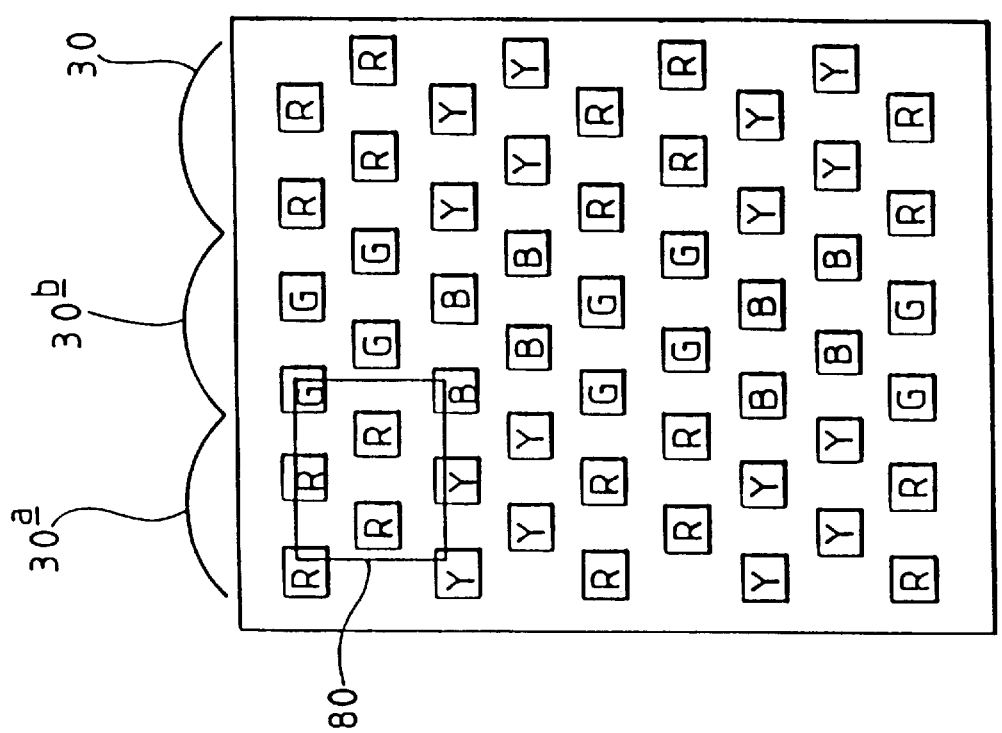
FIG. 27 illustrates part of a 3D autostereoscopic display constituting a twenty fourth embodiment of the invention providing four windows and using an SLM of the RGYB type.

FIGS. 23 to 25 illustrate rectangular tessellations and colour filter arrangements for two view autostereoscopic 3D displays. FIG. 26 illustrates a parallelogram tessellation and colour filter arrangement for a three view autostereoscopic 3D display. FIG. 27 illustrates a rectangular tessellation and colour filter arrangement for a four view autostereoscopic 3D display. The LCDs shown in FIGS. 23 to 27 are of the type disclosed in EP 0 625 861.

Figure 29:
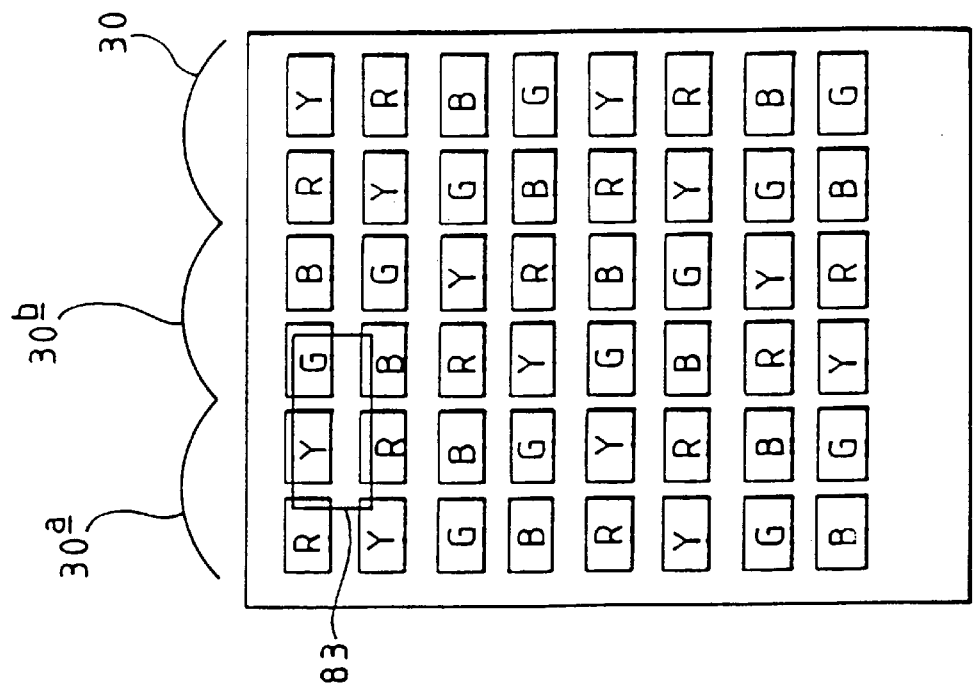
FIG. 29 illustrates part of a 3D autostereoscopic display constituting a twenty sixth embodiment of the invention providing two windows and using an SLM of the RGYB type.
Figure 28:
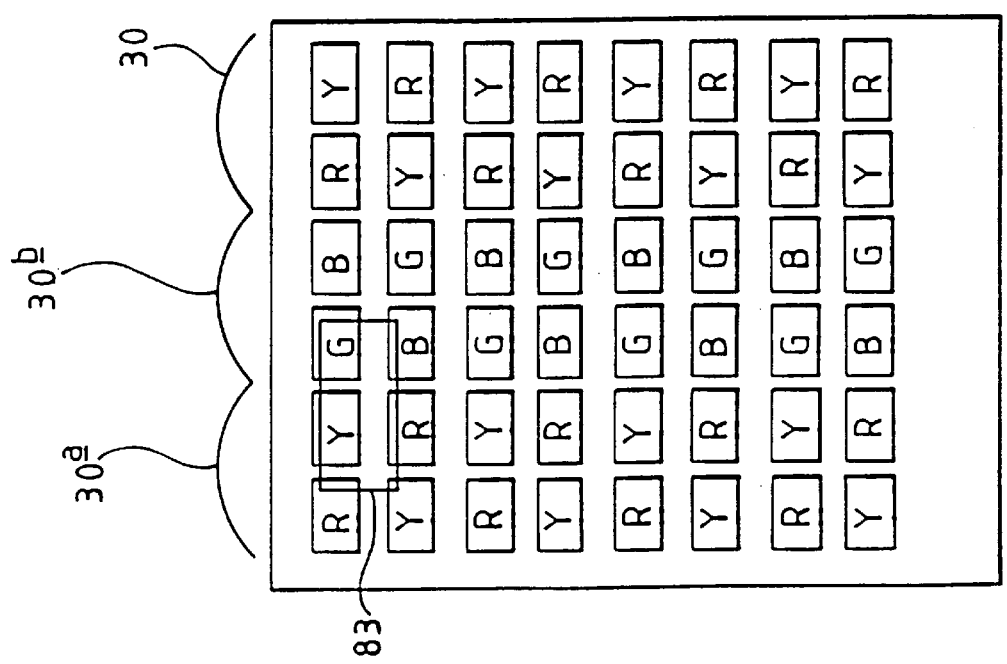
FIG. 28 illustrates part of a 3D autostereoscopic display constituting a twenty fifth embodiment of the invention providing two windows and using an SLM of the RGYB type.

FIGS. 28 and 29 illustrate rectangular tessellations and colour filter arrangements for two view autostereoscopic 3D displays of the type illustrated in FIGS. 21 and 22.

Figure 30:
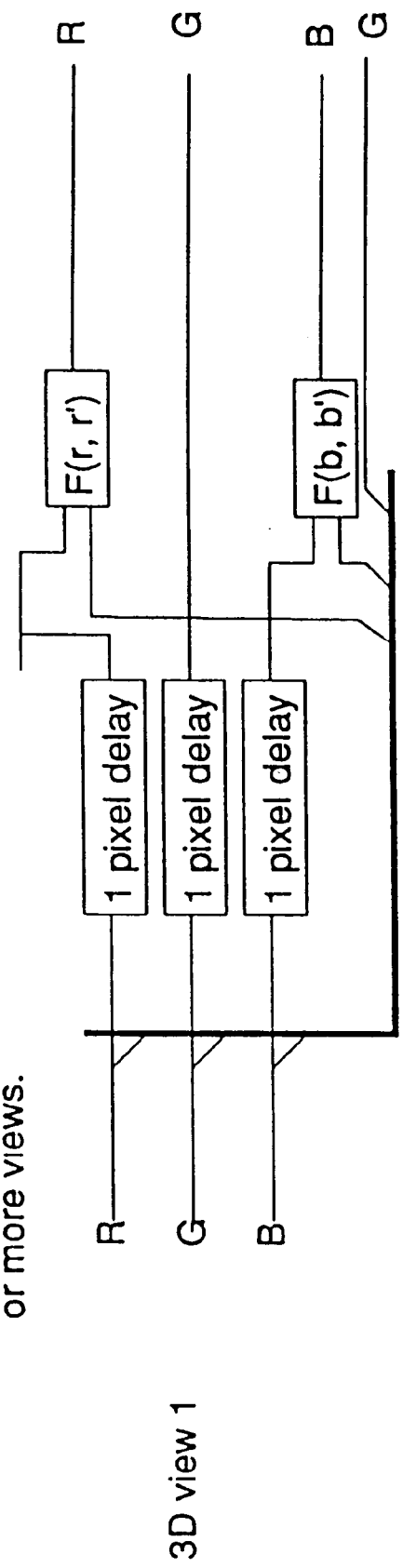
FIG. 30 is a block schematic circuit diagram of an arrangement for generating RGGB data from RGB data.

The arrangement illustrated in FIG. 30 comprises a display interface using a conventional RGB video input signal, indicated as 3D view 1, to process the data and output the two green channels at full resolution while sub-sampling or averaging the red and blue data to give the appropriate pixel information for these colours. Alternatively, the data may be generated specifically as RGGB data by a video source. This reduces band width requirements of the video source but would require non-standard equipment.

The interface generates the data for each RGGB pixel from the data of consecutive RGB pixels supplied from the source. One of the output green channels receives the green data direct. The other green channel receives the green data via a one pixel delay element. The interface is operated by control circuitry (not shown) so that consecutive pairs of RGB pixels from the source are processed to half the number of RGGB (or RGYB) pixels.

The red and blue output data are supplied by respective function generators which receive the red and blue data for the current pixel and, via respective delays, from the preceding pixel. The signals may be normalised if required by additional circuitry (not shown). Such circuitry may implement the process illustrated in FIG. 31.

Figure 31:
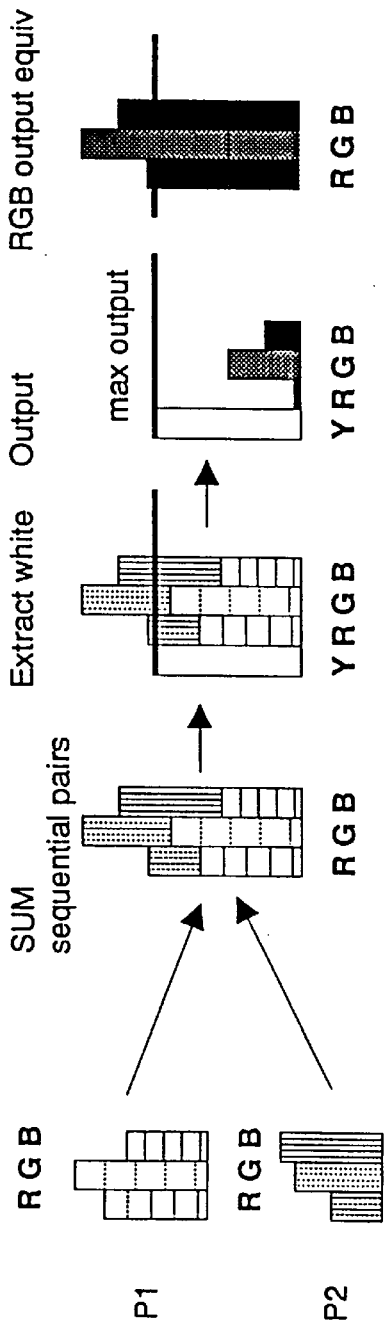
FIG. 31 is a diagram illustrating and comparing generation of RGGB and RGYB data from RGB data.
Figure 31:
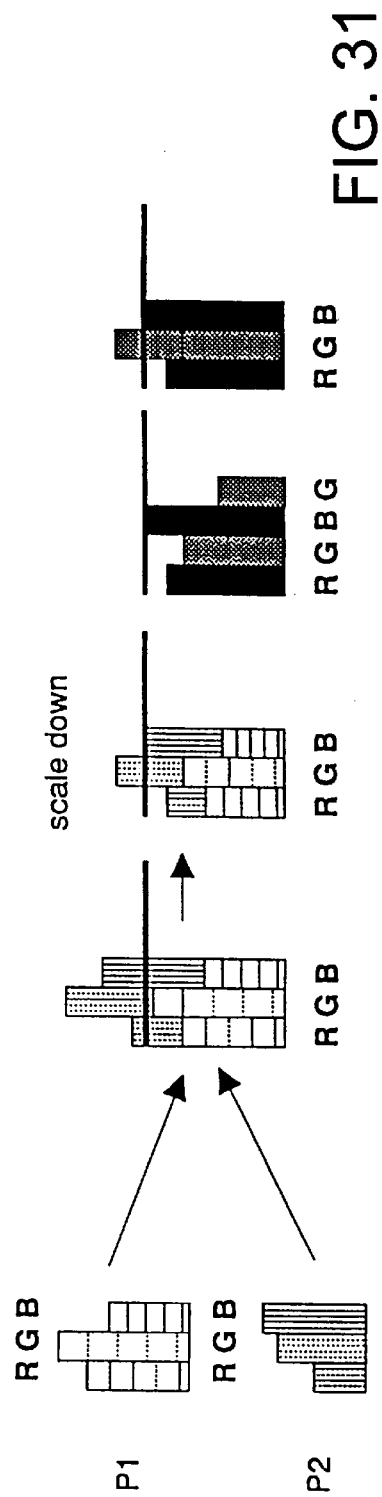

The lower part of FIG. 31 illustrates a generation/normalisation RGGB generation strategy. The RGB data from consecutive pixels P1 and P2 are added together and the amplitudes are then scaled down as necessary to ensure that the red and blue intensities are below the maximum permissible output. The green intensity is then split into two components such that one G output corresponds to the scaled down amplitude of the G component for the pixel P1 and the other G output corresponds to the scaled down amplitude of the G component of the pixel P2.

The upper part of FIG. 31 illustrates a similar technique for deriving RGYB data, again from consecutive RGB pixels P1 and P2. The R, G and B components from the consecutive pixels are summed and the Y component is made equal to the lowest of the summed components or the maximum output, whichever is less. The Y component is then substracted from the R, G and B components so as to provide the RGYB output data. This is analogous to the "Polychromatic Colour Removal" process in printing, where equal amounts of cyan, yellow and magenta inks are replaced by black ink. The use of a Y pixel allows a brighter image, as normalisation for the use of a second green pixel does not have to be made. White images allow all of the pixels to be switched on.

It is thus possible to provide autostereoscopic and stereoscopic 3D displays which are subject to low artifacts, such as reduced colour separation or "break-up", resulting from pixel position differences under each window. Electronic data manipulation and order for addressing the LCDs is relatively easy and there is compatibility with standard drive integrated circuits. Colour filter fabrication is relatively simple. Cross-talk between windows can be made relatively low and cross-talk between pixels within each window may be compromised to achieve this. Unswitched parts of the LCD can be arranged to provide a small contribution to the background contrast level. RGGB displays provide enhanced resolution and RGYB displays provide enhanced brightness and resolution. Electronic addressing is relatively easy as the required amount of line memory is reduced compared with known techniques.

The techniques disclosed herein may be applied, for instance, to thin film transistor twisted nematic, supertwisted nematic, ferroelectric liquid crystal, plasma, electroluminescent and cathode ray tube displays.

Further, such displays are also suitable for use in a "reversionary 2D" mode. In this mode, addressing of the display is modified such that the colour tessellations for 2D are different from those used for the 3D mode. This is so for all colour filter configurations. Colour tessellations for 2D are known and will not be described further.

Such SLMs and 3D displays may be used in many applications, such as personal computer games, 3D television, computer aided design, medical imaging, arcade computer games and scientific visualisation.

What is claimed is:

1. A spatial light modulator, comprising:
    a plurality of picture elements arranged as rows extending in a first direction and columns extending in a second direction substantially perpendicular to the first direction, the columns being arranged as groups of N columns where N is an integer greater than one and the picture elements are arranged as sets of picture elements, and the picture elements of each set are disposed at the apices of a polygon in the same corresponding column among the groups of N columns to form a composite picture element including the picture elements of at least three different colours; and
    circuitry operatively configured to present, selectively to each composite picture element, picture element data corresponding to a given picture element of an image.

2. A modulator as claimed in claim 1, wherein the polygons of the sets are of substantially the some shape and size.

3. A modulator as claimed in claim 2, wherein the orientations of the polygons of the sets vary.

4. A modulator as claimed in claim 1, wherein the apices of each polygon are disposed in adjacent groups of columns.

5. A modulator as claimed in claim 1, wherein the apices of each polygon are disposed in adjacent rows.

6. A modulator as claimed in claim 1, wherein the polygons are triangles.

7. A modulator as clamed in claim 6, wherein the picture elements of each set comprise red, green and blue picture elements (RGB).

8. A modulator as claimed in claim 1, wherein the polygons are rectangles.

9. A modulator as claimed in claim 1, wherein the polygons are parallelograms.

10. A modulator as claimed in claim 8, wherein the picture elements of each set comprise red, green, green and blue picture elements (RGGB).

11. A modulator as claimed in claim 8, wherein the picture elements of each set comprise red, green, white and blue picture elements (RGYB).

12. A modulator as claimed in claim 1, further comprising picture elements which are not members of the sets and which are arranged to resemble regions of the modulator between the picture elements of the sets.

13. A modulator as claimed in claim 1, further comprising a colour filter having a plurality of substantially parallel stripes.

14. A modulator as claimed in claim 13, wherein each stripe is aligned with a respective single row of the picture elements.

15. A modulator as claimed in claim 14, wherein each stripe is aligned with a respective single diagonal line of the picture elements.

16. A modulator as claimed in claim 1, further comprising a colour filter having a plurality of regions, each of which is aligned with a respective group of adjacent picture elements.

17. A modulator as claimed in claim 1, wherein the columns of each group are contiguous.

18. A modulator as claimed in claim 17, wherein the groups of columns ara contiguous.

19. A modulator as claimed in claim 1, further comprising a liquid crystal device.

20. A directional display including a modulator as claimed in claim 1.

21. A modulator as claimed in claim 1, wherein the polygons are selected from among a group consisting of three-sided polygons and four-sided polygons.

* * * * *